United States Patent [19]

Matsuzawa et al.

[11] Patent Number: 5,679,997
[45] Date of Patent: Oct. 21, 1997

[54] BRUSHLESS DC MOTOR AND METHOD FOR DRIVING THE SAME

[75] Inventors: Kinya Matsuzawa; Hiroshi Miyazawa; Norio Ito, all of Suwa, Japan

[73] Assignee: Seiko Epson Corporation, Tokyo, Japan

[21] Appl. No.: 381,855

[22] PCT Filed: Jul. 21, 1993

[86] PCT No.: PCT/JP93/01015

§ 371 Date: Mar. 20, 1995

§ 102(e) Date: Mar. 20, 1995

[87] PCT Pub. No.: WO94/05074

PCT Pub. Date: Mar. 3, 1994

[30] Foreign Application Priority Data

Aug. 12, 1992 [JP] Japan .................................. 4-215158
Dec. 28, 1992 [JP] Japan .................................. 4-348865

[51] Int. Cl.$^6$ .............................. H02K 1/12; H02K 19/04; H02K 21/22
[52] U.S. Cl. .............................. 310/254; 310/180; 310/164
[58] Field of Search .............................. 310/49 R, 164, 310/193, 162, 254, 180, 67 R

[56] References Cited

U.S. PATENT DOCUMENTS 3,857,053 12/1974 Yatsushiro et al. .................. 310/162
4,004,168 1/1977 Haydon .................. 310/164
4,656,381 4/1987 Komatsu .................. 310/164

FOREIGN PATENT DOCUMENTS 61-214759 9/1986 Japan .

*Primary Examiner*—Clayton E. LaBalle
*Attorney, Agent, or Firm*—Kanesaka & Takeuchi

[57] ABSTRACT

In a radial gap type brushless DC motor having a motor structure for generating an starting torque and lowering rotational speed fluctuation by forming either one of a pair of upper and lower (right and left) claw poles to have a smaller interval in the circumferential direction with respect to the other claw pole, shifting the position of the upper or lower claw poles toward the rotating direction of the rotor from the middle position of the other claw pole and claw pole, and setting a ratio (a/p) of the claw pole width a and the pole pitch p, a ratio (b/a) of the claw pole width a and the claw pole width b, and a ratio (c/d) of the claw pole pitch c and the claw pole pitch d to fall in a prescribed range, a method for driving a motor forms the generated torque cycle of a cogging torque generated between a permanent magnet rotor (2) and a stator into large and small torque waves, and switches the current of a coil (12) at a high peak of absolute quantity or in the vicinity thereof among a plurality of positive peaks of the cogging torque. Further, a method for driving a motor wherein the coil current is switched at a position where the excited torque generated by the coil current becomes zero or in its vicinity. And, a method for driving a motor wherein the coil current is switched in a vicinity of a positive peak of the cogging torque and giving a no-current passing period when switching the coil current.

3 Claims, 37 Drawing Sheets

FIG.5
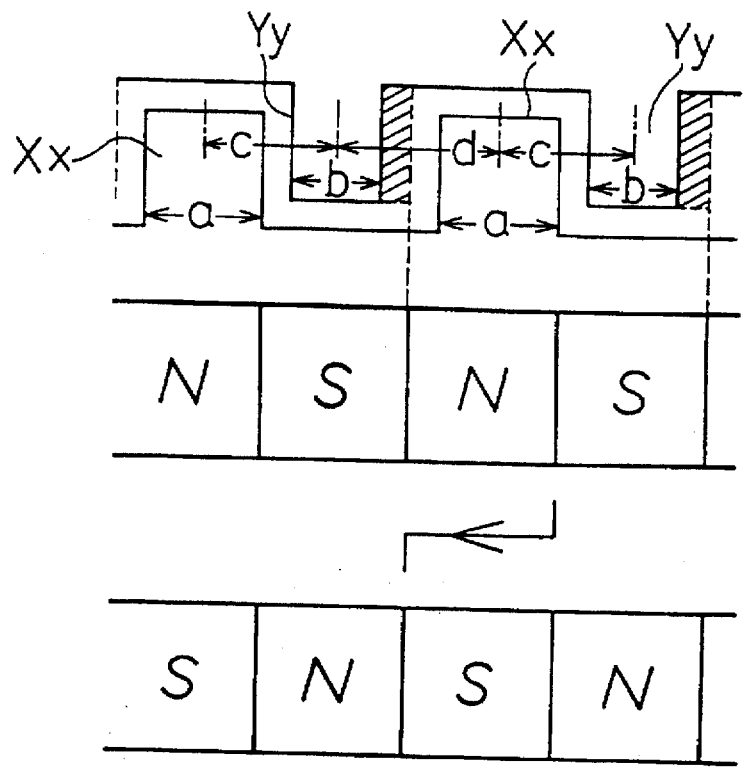
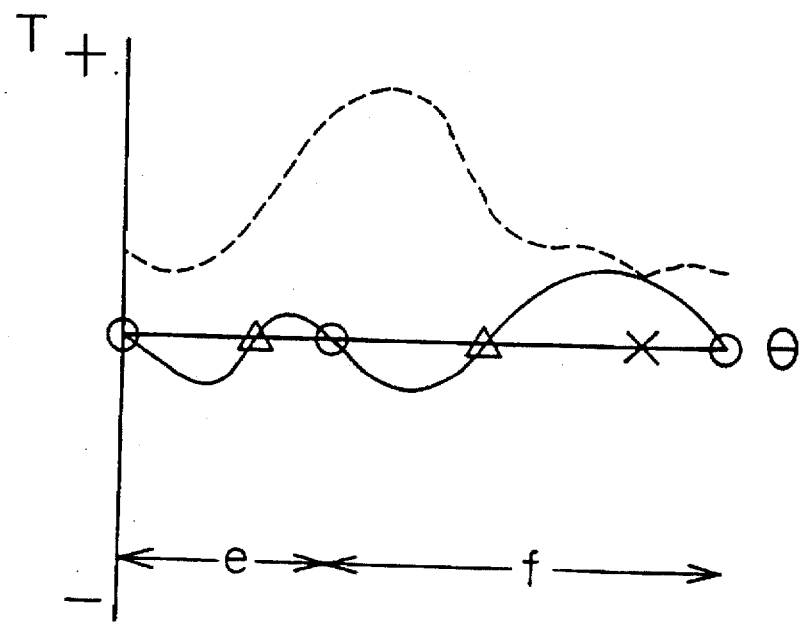

FIG.6
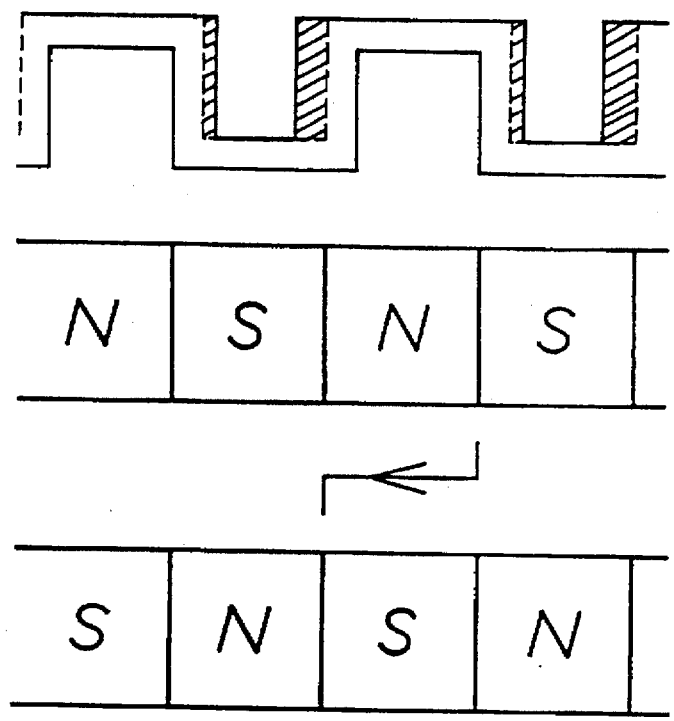
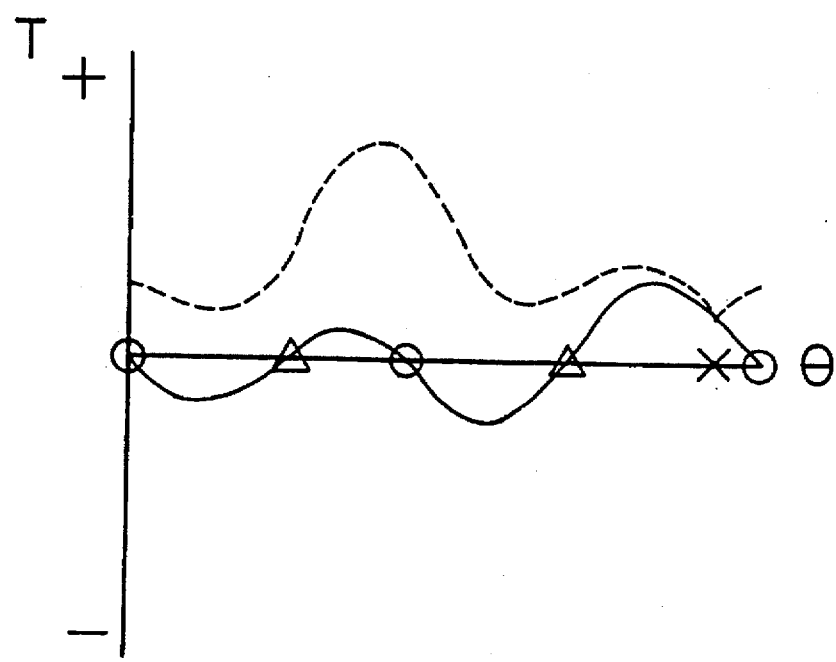

FIG. 7
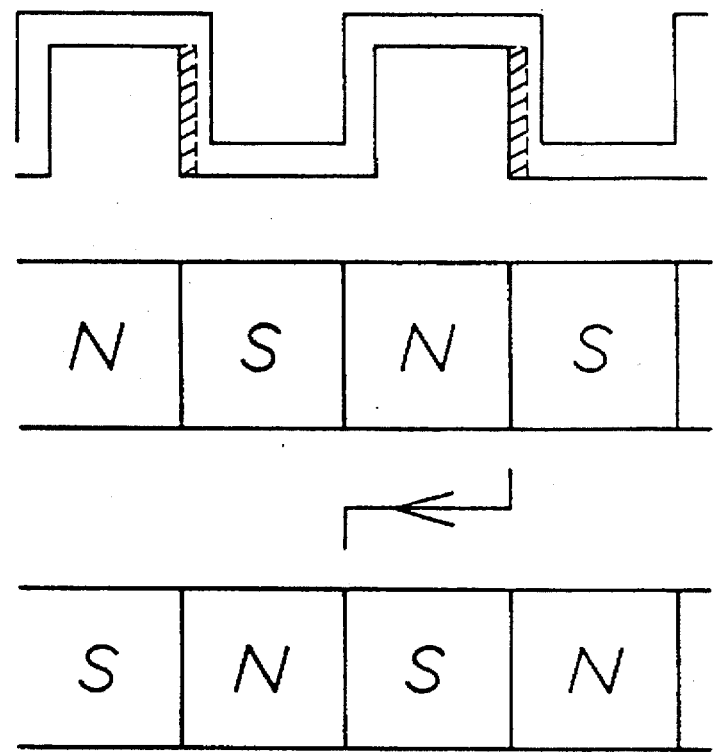
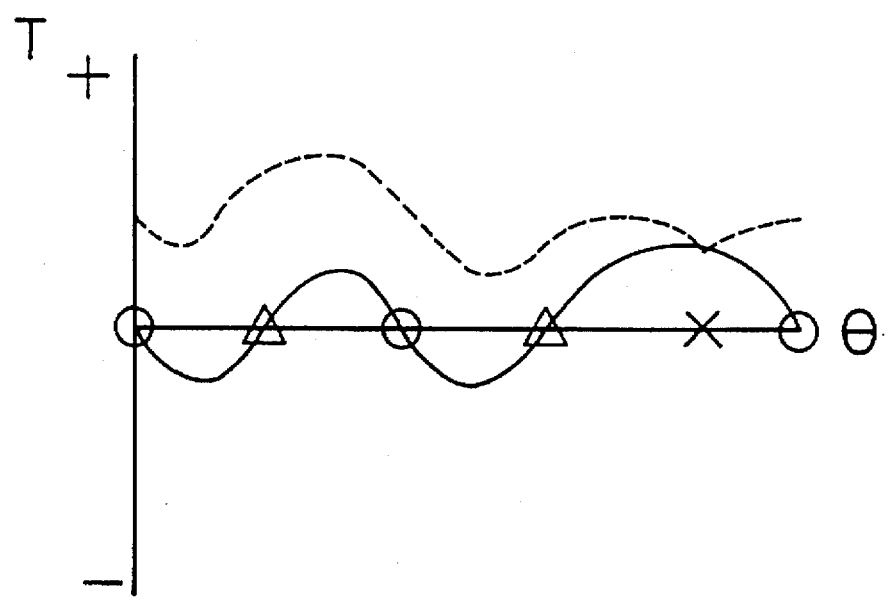

FIG.8
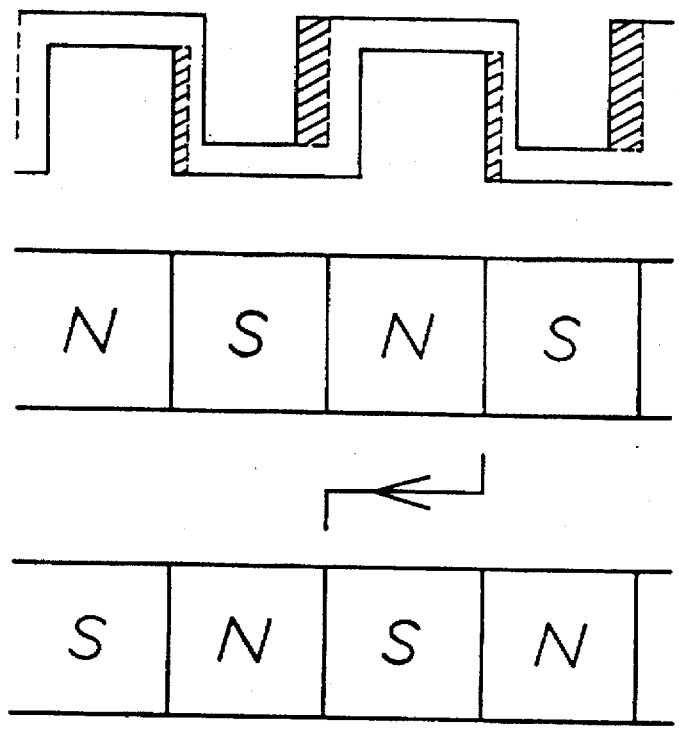
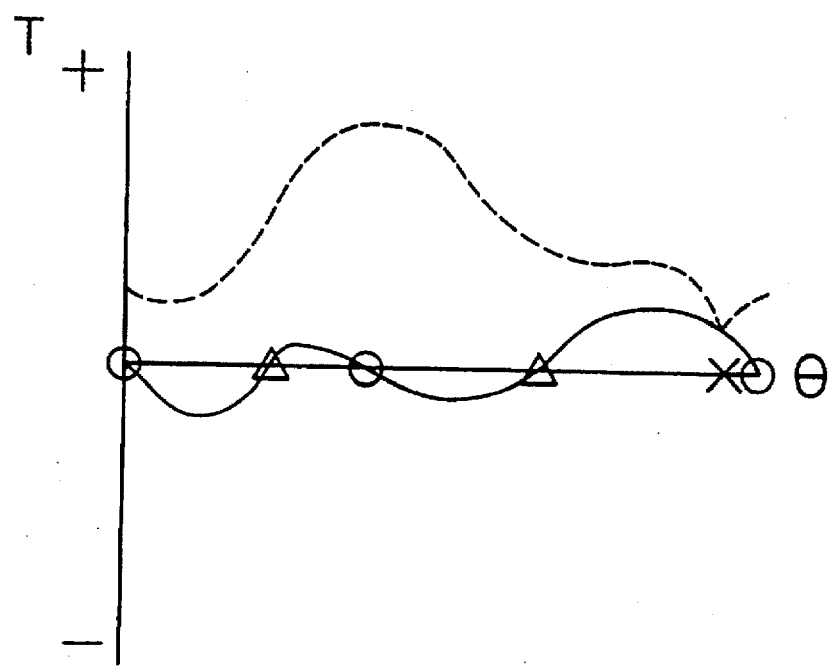

FIG.9
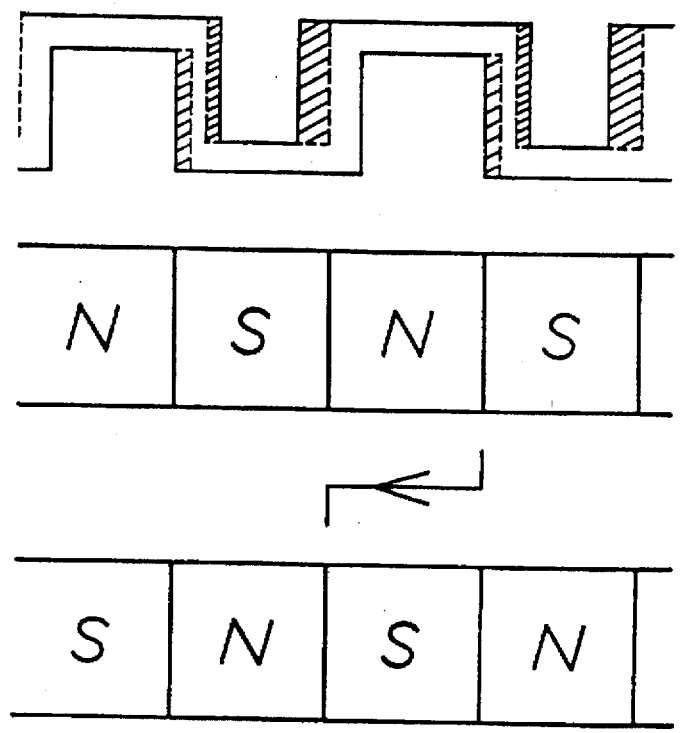
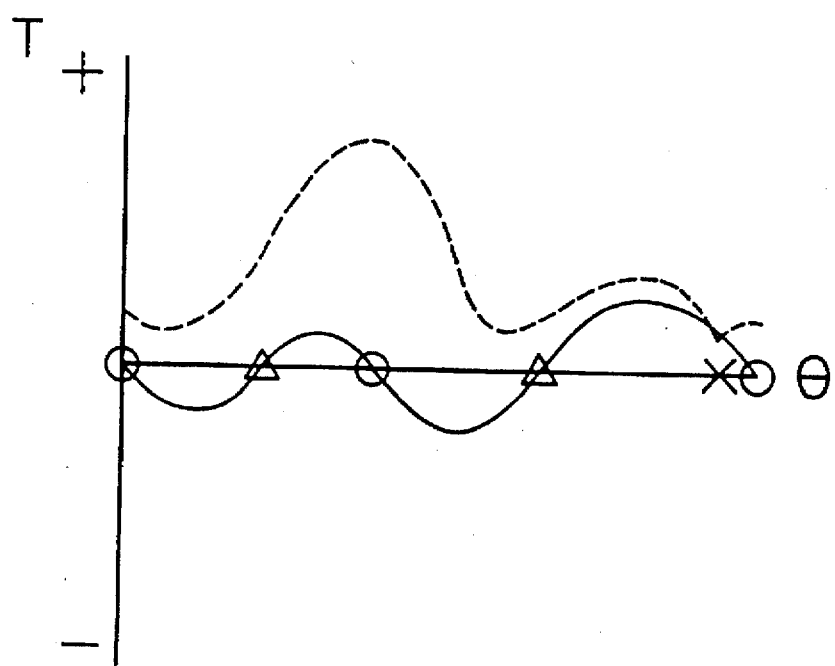

FIG.10
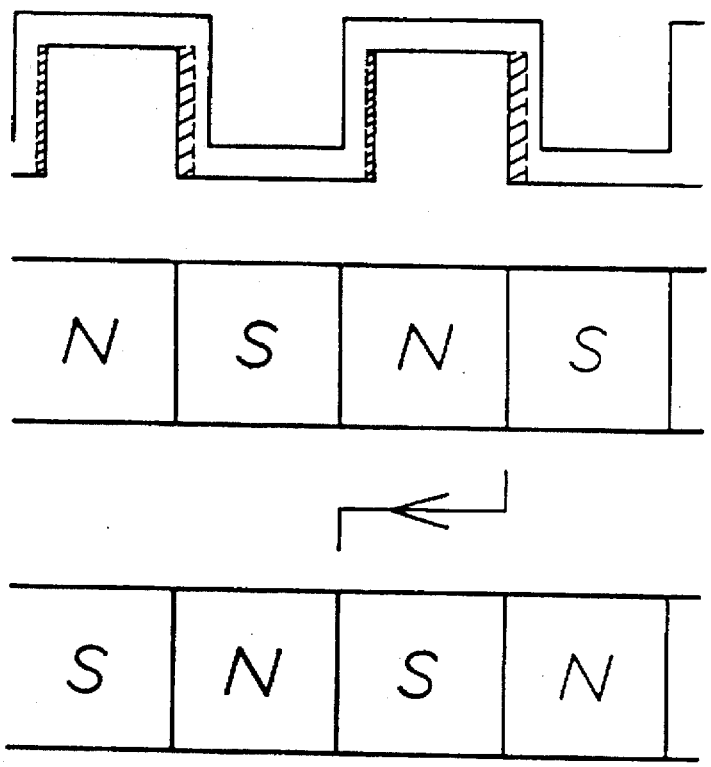
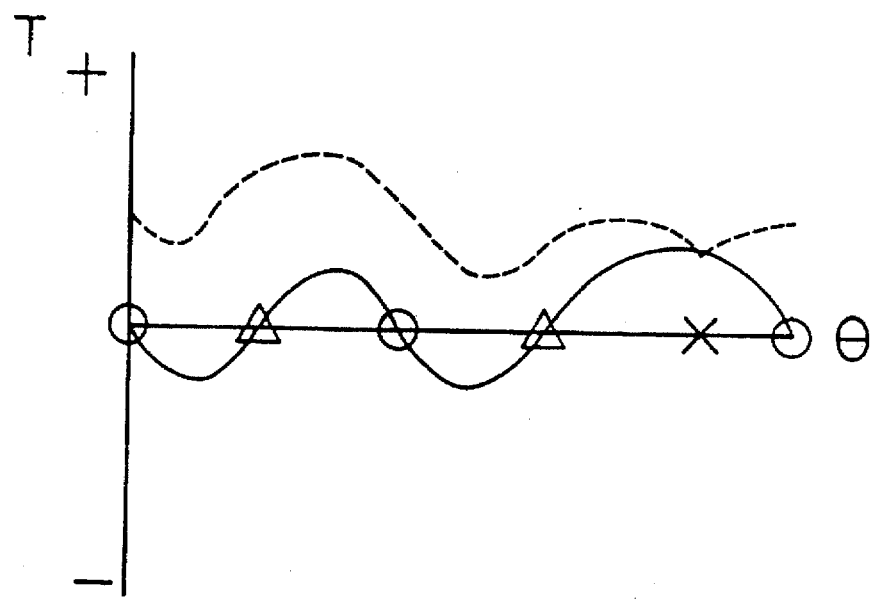

FIG.11
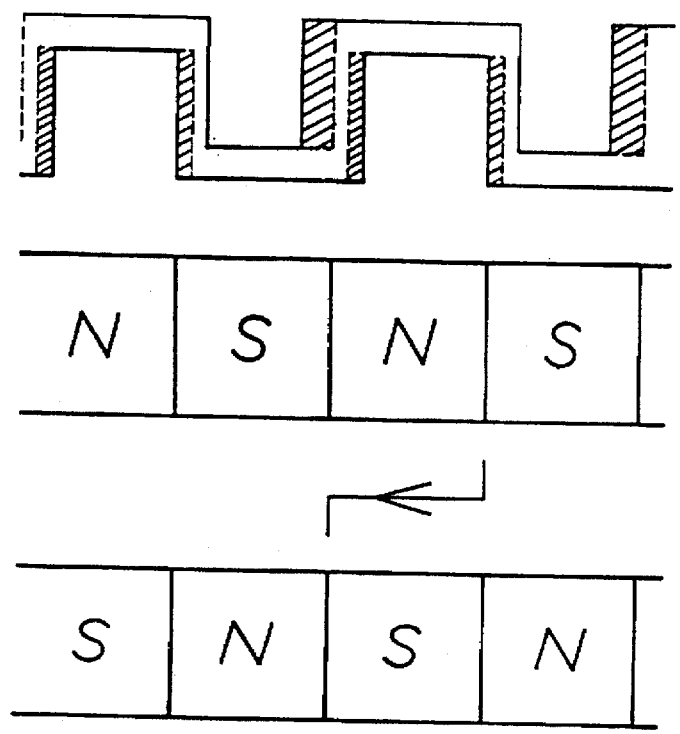
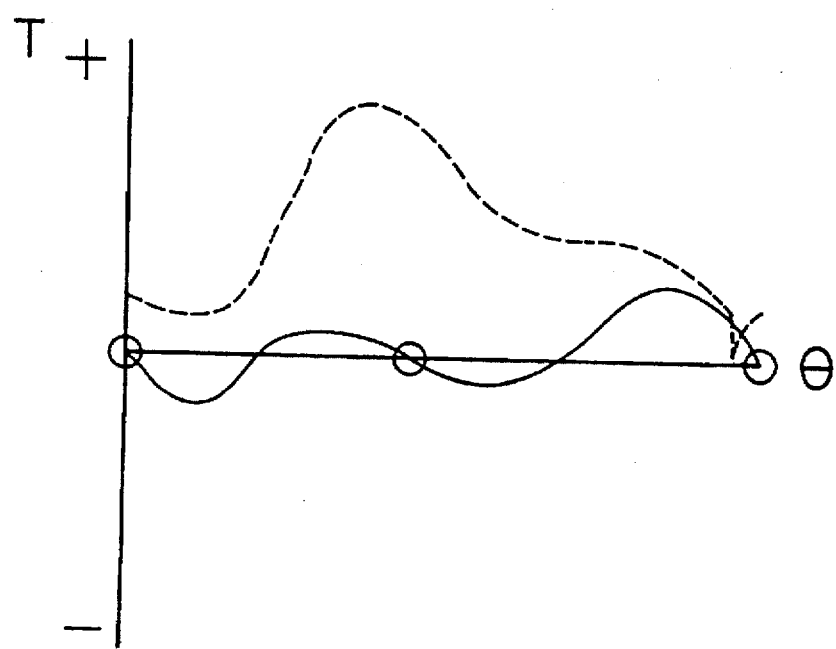

FIG.12
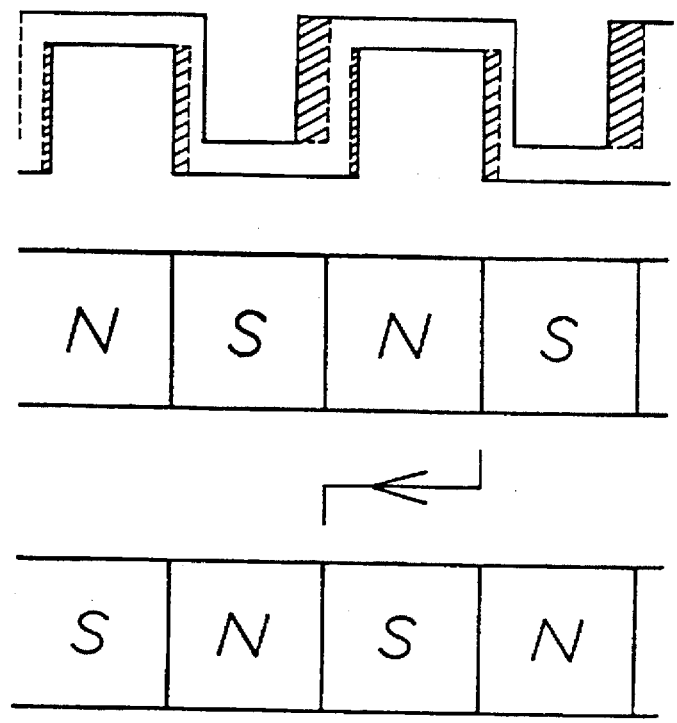
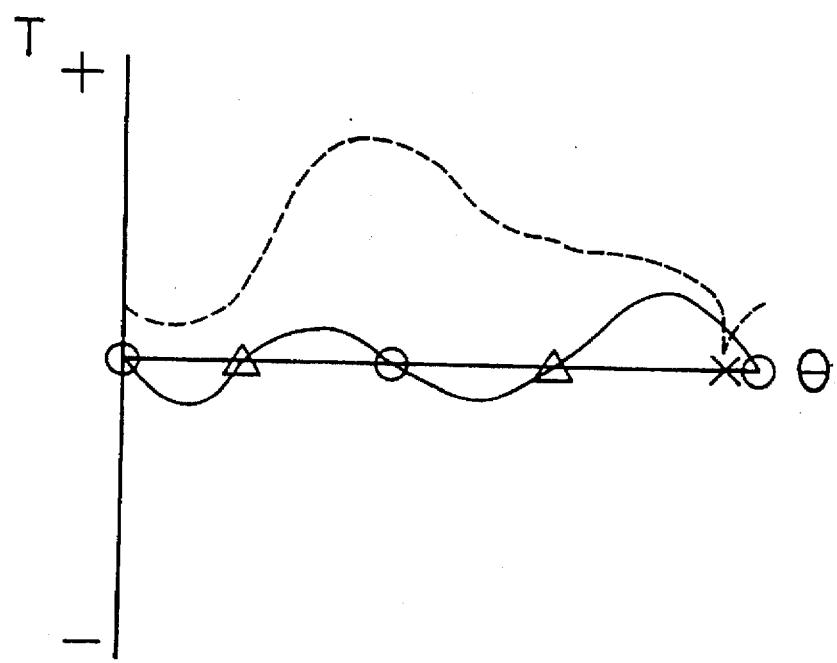

FIG.13
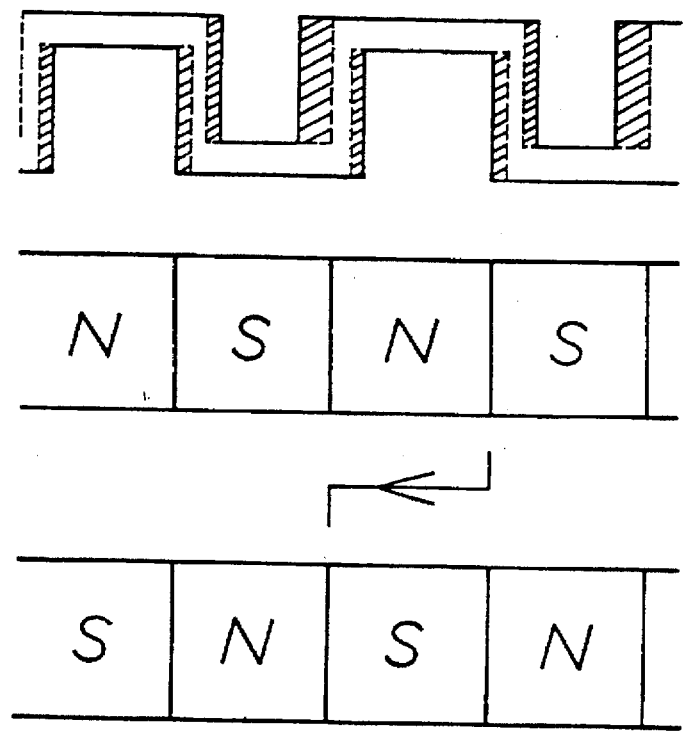
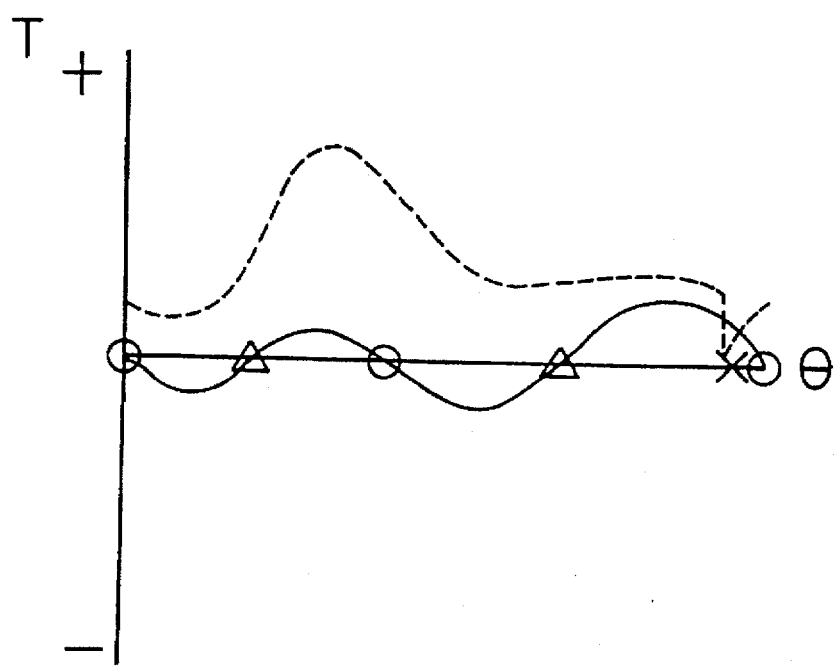

FIG.14
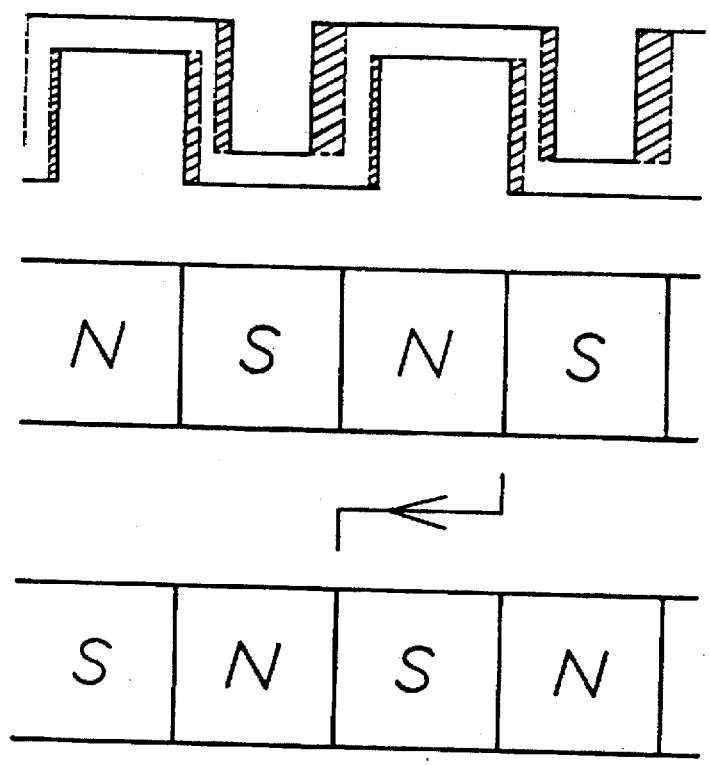
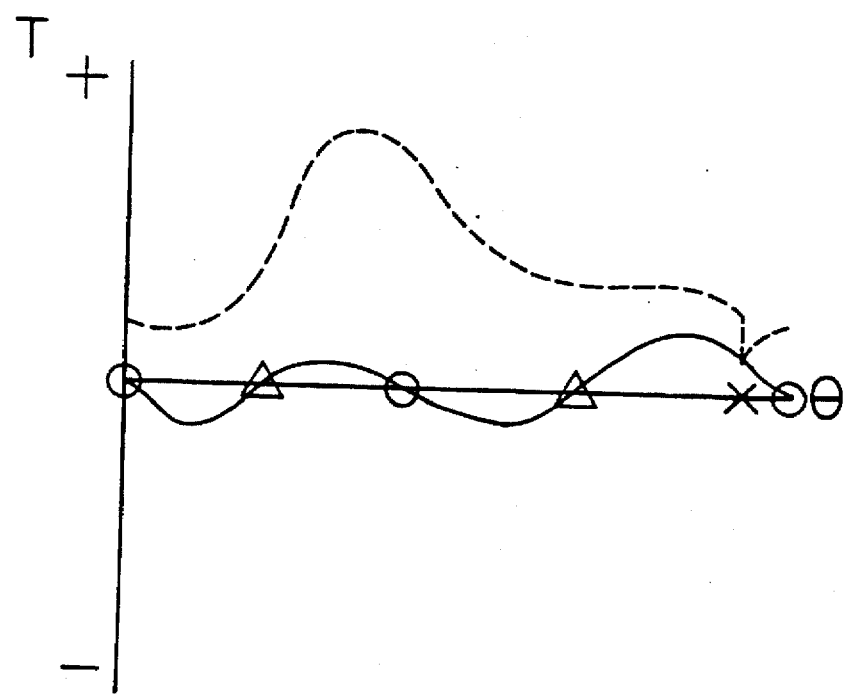

No-current passing time

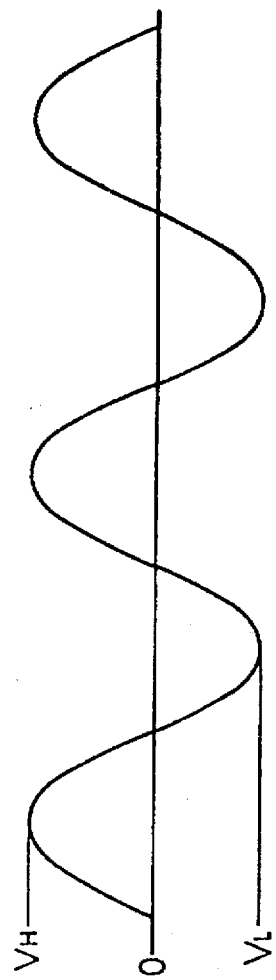
FIG. 21(a) Hole element amplified waveform
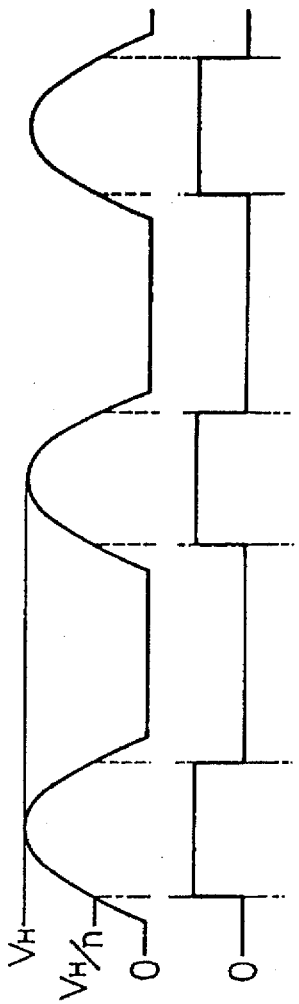
FIG. 21(b) Plus side waveform
FIG. 21(c) Transistor (Tr1) drive waveform
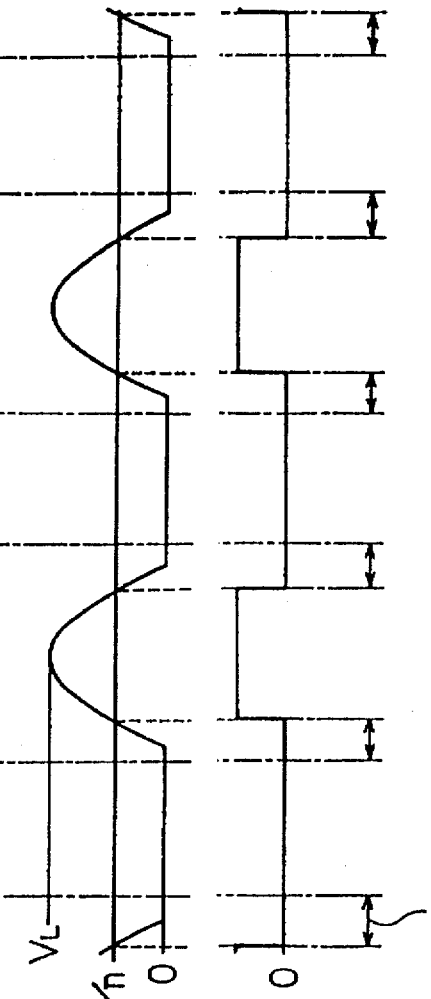
FIG. 21(d) Minus side waveform
FIG. 21(e) Transistor (Tr2) drive waveform

| b/a \ c/d | 0.60 | 0.63 | 0.67 | 0.70 | 0.74 | 0.78 | 0.82 | 0.86 | 0.90 | 0.95 | 1.00 |
|---|---|---|---|---|---|---|---|---|---|---|---|
| 0.50 | ○ |  |  |  |  |  |  |  |  |  | × |
| 0.55 |  | ○ | ○ |  | ○ |  | ○ |  | ○ |  | × |
| 0.60 |  |  | ○ | ○ | ○ |  |  |  |  | ○ | × |
| 0.65 |  |  |  | ○ | ○ | ○ | ○ | ○ | ○ |  | × |
| 0.70 |  |  |  |  | ○ | ○ | ○ | ○ |  | ○ | × |
| 0.75 |  |  |  |  |  | ○ | ○ | ○ | ○ |  | × |
| 0.80 |  |  |  |  |  |  |  | ○ | ○ | ○ | × |
| 0.85 |  |  |  |  |  |  |  |  | ○ |  | × |
| 0.90 |  |  |  |  |  |  |  |  |  | ○ | × |
| 0.95 |  |  |  |  |  |  |  |  |  |  | × |
| 1.00 |  |  |  |  |  |  |  |  |  |  | × |

FIG.23 a/p = 0.95

| b/a \ c/d | 0.56 | 0.59 | 0.61 | 0.64 | 0.68 | 0.71 | 0.74 | 0.80 | 0.83 | 0.87 | 0.91 | 1.00 |
|---|---|---|---|---|---|---|---|---|---|---|---|---|
| 0.50 | ○ | | | | ○ | | ○ | | ○ | | ○ | × |
| 0.55 | | ○ | ○ | ○ | | ○ | | ○ | | ○ | | × |
| 0.60 | | | ○ | ○ | ○ | | ○ | | ○ | | ○ | × |
| 0.65 | | | | | | ○ | ○ | ○ | | ○ | | × |
| 0.70 | | | | | ○ | ○ | ○ | | ○ | | ○ | × |
| 0.75 | | | | | | | ○ | ○ | | ○ | | × |
| 0.80 | | | | | | | | ○ | ○ | | ○ | × |
| 0.85 | | | | | | | | | ○ | ○ | | × |
| 0.90 | | | | | | | | | | ○ | ○ | × |
| 0.95 | | | | | | | | | | | | × |
| 1.00 | | | | | | | | | | | | × |

| b/a \ c/d | 0.49 | 0.51 | 0.54 | 0.57 | 0.59 | 0.62 | 0.65 | 0.68 | 0.71 | 0.74 | 0.78 | 0.85 | 0.90 | 0.95 | 1.00 |
|---|---|---|---|---|---|---|---|---|---|---|---|---|---|---|---|
| 0.50 | ○ |  |  |  |  |  |  |  |  |  |  |  | ○ |  | × |
| 0.55 |  | ○ | ○ |  | ○ |  | ○ |  | ○ |  |  | ○ |  | ○ | × |
| 0.60 |  |  |  | ○ |  | ○ |  | ○ |  | ○ |  |  | ○ |  | × |
| 0.65 |  |  | ○ |  | ○ |  | ○ |  | ○ |  |  | ○ |  | ○ | × |
| 0.70 |  |  |  | ○ |  | ○ |  | ○ |  | ○ |  |  | ○ |  | × |
| 0.75 |  |  |  |  | ○ |  | ○ |  | ○ |  |  | ○ |  | ○ | × |
| 0.80 |  |  |  |  |  | ○ |  | ○ |  |  |  |  | ○ |  | × |
| 0.85 |  |  |  |  |  |  | ○ |  | ○ | ○ | ○ | ○ |  | ○ | × |
| 0.90 |  |  |  |  |  |  |  | ○ |  |  | ○ | ○ | ○ |  | × |
| 0.95 |  |  |  |  |  |  |  |  |  | ○ |  |  |  | ○ | × |
| 1.00 |  |  |  |  |  |  |  |  |  |  | × |  | × |  | × |

FIG. 26 a/p = 0.8

| c/d \ b/a | 0.43 | 0.45 | 0.47 | 0.49 | 0.51 | 0.54 | 0.56 | 0.59 | 0.61 | 0.64 | 0.67 | 0.75 | 0.80 | 0.85 | 0.90 | 0.95 | 1.00 |
|---|---|---|---|---|---|---|---|---|---|---|---|---|---|---|---|---|---|
| 0.50 | O |   | O |   | O |   | O |   | O |   | O |   | O |   | O |   | X |
| 0.55 |   | O |   | O |   | O |   | O |   | O |   | O |   | O |   | O | X |
| 0.60 |   |   | O |   | O |   | O |   | O |   | O |   | O |   | O |   | X |
| 0.65 |   |   |   | O |   | O |   | O |   | O |   | O |   | O |   | O | X |
| 0.70 |   |   |   |   | O |   | O |   | O |   | O |   | O |   | O |   | X |
| 0.75 |   |   |   |   |   | O |   | O |   | O |   | O |   | O |   | O | X |
| 0.80 |   |   |   |   |   |   | O |   | O |   | O |   | O |   | O |   | X |
| 0.85 |   |   |   |   |   |   |   | O |   | O |   | O |   | O |   | O | X |
| 0.90 |   |   |   |   |   |   |   |   | O |   | O |   | O |   | O |   | X |
| 0.95 |   |   |   |   |   |   |   |   |   | O |   | O |   | O |   | O | X |
| 1.00 |   |   |   |   |   |   |   |   |   |   | X |   | X |   | X |   | X |

FIG.27 a/p = 0.75

| b/a \ c/d | 0.39 | 0.41 | 0.43 | 0.45 | 0.47 | 0.49 | 0.51 | 0.53 | 0.55 | 0.58 | 0.60 | 0.65 | 0.70 | 0.75 | 0.80 | 0.90 | 1.00 |
|---|---|---|---|---|---|---|---|---|---|---|---|---|---|---|---|---|---|
| 0.50 | ○ |   |   |   |   |   |   |   |   |   |   |   |   |   |   |   | × |
| 0.55 |   | ○ | ○ |   |   |   |   |   |   |   |   |   |   |   |   |   | × |
| 0.60 |   |   | ○ | ○ | ○ |   |   |   | ○ |   | ○ |   | ○ |   | ○ |   | × |
| 0.65 |   |   |   | ○ | ○ | ○ |   |   |   |   |   |   |   |   |   |   | × |
| 0.70 |   |   |   |   | ○ | ○ | ○ |   |   |   | ○ |   | ○ |   | ○ |   | × |
| 0.75 |   |   |   |   |   | ○ | ○ | ○ |   |   |   |   |   |   |   |   | × |
| 0.80 |   |   |   |   |   |   | ○ | ○ | ○ | ○ | ○ | ○ | ○ | ○ | ○ | ○ | × |
| 0.85 |   |   |   |   |   |   |   | ○ | ○ |   |   |   |   |   |   |   | × |
| 0.90 |   |   |   |   |   |   |   |   | ○ | ○ | ○ | ○ | ○ | ○ | ○ | ○ | × |
| 0.95 |   |   |   |   |   |   |   |   |   | ○ |   | ○ |   | ○ |   |   | × |
| 1.00 |   |   |   |   |   |   |   |   |   |   |   |   |   |   |   |   | × |

FIG.28 a/p = 1.0

| b/a \ c/d | 0.60 | 0.63 | 0.67 | 0.70 | 0.74 | 0.78 | 0.82 | 0.86 | 0.90 | 0.95 | 1.00 |
|---|---|---|---|---|---|---|---|---|---|---|---|
| 0.50 | ○ | | | | | | | | | | ○ |
| 0.55 | | ○ | ○ | ○ | ○ | | | | | | ○ |
| 0.60 | | | ○ | ○ | ○ | ○ | | | | | ○ |
| 0.65 | | | | ○ | ○ | ○ | | | | | ○ |
| 0.70 | | | | | ○ | ○ | ○ | | | | ○ |
| 0.75 | | | | | | ○ | ○ | ○ | | | ○ |
| 0.80 | | | | | | | ○ | ○ | ○ | | ○ |
| 0.85 | | | | | | | | ○ | ○ | ○ | ○ |
| 0.90 | | | | | | | | | ○ | | △ |
| 0.95 | | | | | | | | | | △ | △ |
| 1.00 | | | | | | | | | | | △ |

FIG.29 a/p = 0.95

| c/d \ b/a | 0.56 | 0.59 | 0.61 | 0.64 | 0.68 | 0.71 | 0.74 | 0.80 | 0.83 | 0.87 | 0.91 | 1.00 |
|---|---|---|---|---|---|---|---|---|---|---|---|---|
| 0.50 | ○ | | | | | | | | | | | ○ |
| 0.55 | | ○ | ○ | | ○ | | | | | | ○ | ○ |
| 0.60 | | | ○ | | | ○ | | ○ | | ○ | | ○ |
| 0.65 | | | | ○ | | | ○ | | ○ | | | ○ |
| 0.70 | | | | ○ | ○ | ○ | | ○ | | ○ | ○ | ○ |
| 0.75 | | | | | ○ | ○ | | | ○ | | | ○ |
| 0.80 | | | | | | | ○ | ○ | | ○ | | ○ |
| 0.85 | | | | | | | | | ○ | | ○ | ○ |
| 0.90 | | | | | | | | | | ○ | | ○ |
| 0.95 | | | | | | | | | | | ○ | ○ |
| 1.00 | | | | | | | | | | | | ○ |

| b/a \ c/d | 0.39 | 0.41 | 0.43 | 0.45 | 0.47 | 0.49 | 0.51 | 0.53 | 0.55 | 0.58 | 0.60 | 0.65 | 0.70 | 0.75 | 0.80 | 0.90 | 1.00 |
|---|---|---|---|---|---|---|---|---|---|---|---|---|---|---|---|---|---|
| 0.50 | × | | | | × | | | | | | | | △ | | ○ | | ○ |
| 0.55 | | × | × | △ | | △ | △ | △ | △ | △ | △ | △ | | ○ | | ○ | ○ |
| 0.60 | | | | △ | △ | △ | △ | ○ | △ | ○ | ○ | ○ | ○ | | ○ | | ○ |
| 0.65 | | | | | ○ | △ | ○ | ○ | ○ | ○ | ○ | ○ | | ○ | | ○ | ○ |
| 0.70 | | | | | | ○ | ○ | ○ | ○ | ○ | ○ | ○ | ○ | | ○ | | ○ |
| 0.75 | | | | | | | ○ | ○ | ○ | ○ | ○ | ○ | | ○ | | ○ | ○ |
| 0.80 | | | | | | | | | ○ | ○ | ○ | ○ | ○ | | ○ | | ○ |
| 0.85 | | | | | | | | | | ○ | ○ | ○ | | ○ | | ○ | ○ |
| 0.90 | | | | | | | | | | | ○ | ○ | ○ | | ○ | | ○ |
| 0.95 | | | | | | | | | | | | | | ○ | ○ | ○ | ○ |
| 1.00 | | | | | | | | | | | ○ | ○ | | | ○ | | ○ |

BRUSHLESS DC MOTOR AND METHOD FOR DRIVING THE SAME

TECHNICAL FIELD

This invention relates to a brushless DC motor, and more particularly to a brushless DC motor structure which excels in self starting reliability and has the rotational speed fluctuation reduced, and to a method for driving it.

BACKGROUND ART

Such a conventional radial gap type brushless DC motor has its rotor 51 consisted of a cup shaped back yoke 52, an annular permanent magnet 53 adhered to the inner wall of the back yoke, and a shaft, 55 inserted in a bush 54 at the center of the back yoke 52, as shown in FIG. 34. In the drawing, the reference numeral 56 represents a turn table.

A stator 57 consists of first and second stator yokes 58, 59 made of soft magnetic metal plate and a coil 60 disposed between the both stator yokes 58, 59 as shown in FIG. 35. These stator yokes 58, 59 have claw poles 58a, 59a which are pole pieces radially extended outward from the center and bent at right angles, and integrally formed rings 61, 62 at the center along the direction the claw poles 58a, 59a are bent. In the drawing, the motor is of four poles.

The first stator yoke 58 and the second stator yoke of the stator 57 are assembled with the coil 60 therebetween. A ring 61 and another ring 62 are joined to be magnetically connected to form a magnetic circuit. And, keeping a prescribed gap from the circumference of the permanent magnet 53 of the rotor 51, the claw poles 58a and the claw poles 59a of the first stator yoke 58 and the second stator yoke 59 are alternately disposed in the circumferential direction.

Further, a sleeve 63 is mounted within the ring 61 of the stator 57, and the shaft 55 of the rotor 51 is supported within the sleeve 63 via a bearing 64. At the bottom of the sleeve 63, a base plate 65 is fitted to support the stator 57, and a circuit substrate 66 is fixed to the base plate 65. In the drawing, the reference numeral 67 indicates a hole element which is a sensor for detecting magnetic pole of the rotor, and G indicates a gap.

In a conventional brushless DC motor, claw pole width a of one claw pole Xx is generally the same to claw pole width b of the other claw pole Yy as shown in FIG. 36 and FIG. 37(a), and claw pole pitch c from the one claw pole Xx to the other claw pole Yy is set to be equal to claw pole pitch d from the other claw pole Yy to the one claw pole Xx. In other words, claw poles having an equal claw pole width are combined at equal intervals. When a torque curve in this case is drawn (vertical axis: torque T, horizontal axis: machine angle θ), FIG. 37 (b) shows that when a cogging torque shown by a solid line (torque due to attraction by the magnet and stator yoke) reaches point B (unstable point: mark △) at 180 degrees in electrical angle (for one magnetic pole in machine angle) from point 0 (unstable point: mark △) via point A (stable point: mark o) in the rotation for one magnetic pole of the rotor, a negative torque works from point A and forward to generate a returning force to the rotor, and when the rotor is rotated in the opposite direction, a positive torque works to generate a force to point A. Suppose the position of the hole element is point C, polarity is switched at this point C, and the generated torque shown by a dotted line (torque which is generated when electricity is flown, and the sum of the excited torque and a cogging torque generated by the coil current) drops at point C as illustrated, generates a negative torque in the illustrated shaded area, and moves forward through point B. When the negative torque is generated, a dead point (point where self-starting is impossible) is always generated. This dead point is B in the drawing. The rotor stops at point A which is a stable point when the motor is under no load, but since it does not always stop at point. A when an external load is on the motor, the motor cannot rotate even when electricity is flown if the rotor stops at point B.

Generally, the motor is used as so-called actuator and under some load as described above. And, since the rotor does not always stop at so-called stable point, a dead point is generated, and when the rotor is positioned at the dead point, this results in a drawback that the motor cannot be used in most cases.

In a technique capable of improving self-starting reliability, the stator yoke is generally disposed to generate a magnetic unbalance on the circumference where an air gap is formed, to deviate a static stable position of the permanent magnet rotor from a position of excited torque zero. For example, Japanese Patent Application Laid-open Print No. 23754/1989 uses the stator yoke having claw poles with an equal width, and disposes the claw poles at unequal intervals. According to this art, self-starting reliability is improved, but since the negative torque cannot be eliminated at a point where polarity is switched, the dead point still exists.

As techniques to eliminate the negative torque, Japanese Patent Application Laid-open Print Nos. 229637/1985, 150643/1986 and 4454/1986 are known. They provide special shaped claw poles to prevent the generation of a negative torque under the excited condition.

But, they have drawbacks that the claw poles have a complicated shape and cannot be fabricated easily, resulting in difficulty in obtaining high fabrication accuracy, and magnetic control and rotation control are difficult.

A motor described in Japanese Patent Application Laid-open Print No. 144788/1988 is known, which improves self-starting reliability by devising a driving circuit of the motor. When a hole element is generally used to switch the polarity of the applied voltage to the motor coil, it controls to give a no-current passing period when switching, to remedy the degradation or of self-starting reliability characteristics due to excessively late or early switching timing of the polarity of the polarity of the applied voltage to the coil. Although it can avoid the generation of a negative torque by controlling to give the no-current passing period when switching, when a voltage value of the detected signal of the hole element varies, this no-current passing period changes accordingly, resulting in a drawback that a large negative torque takes place.

And, this conventional radial gap type brushless DC motor has been generally developed to remedy the impossibility of self-starting and a specific measure is not taken to reduce the rotational speed fluctuation. In this connection, the motor described in the aforementioned Japanese Patent Application Laid-open Print No. 150643/1986 is to reduce the nonuniformity of rotation by disposing a third claw pole between first and second claw poles, but the shape of claw poles is complex and their fabrication is hard as described above, so that it has drawbacks that high fabrication accuracy is hardly obtainable, and magnetic control and rotation control are difficult. Thus, it is not practical.

In view of the above circumstances, this invention aims to provide a motor structure and a method for controlling the rotation of a motor, whose self-starting reliability can be improved and the rotational speed fluctuation can be reduced by a relatively simple structure.

The applicant of this invention has proposed a motor to accomplish the above object while keeping the shapes of first and second stator yokes made of soft magnetic metallic plate identical (Japanese Patent Application No. 297411/1991). As shown in FIG. 38, claw pole 58a and claw pole 59a of a first stator yoke 58 and a second stator yoke 59 are alternately disposed, the claw poles 58a, 59a are formed to have the same claw pole width, the position of a static stable point due to a cogging torque is structured adjacent to the maximum torque point of an excited torque generated by flowing current through a coil, and a sensor for detecting the poles of a permanent magnet is positioned deviated from the middle of an opposing claw pole, so that self-starting is possible. Specifically, a ratio of claw pole width m and pole pitch p of a permanent magnet 53 (m/p) is determined to be 75 to 85%.

This invention proposes a motor structure and a motor rotating method, where the claw pole shapes of first and second stator yokes are alternately different without being restricted by the ratio of claw pole width m and pole pitch p of a permanent magnet (m/p), or by slightly changing the structure from that of Japanese Patent Application No. 297411/1991, the claw pole shape is not so complex as a conventional one but systematic, and therefore high fabrication accuracy is obtainable, and magnetic control and rotation control are easy.

SUMMARY OF THE INVENTION

To accomplish the above objects, a brushless DC motor of this invention comprises a cylindrical or segment shaped permanent magnet rotor which has N and S poles alternately magnetized in multiple electrodes at an equal pitch in the circumferential direction, a stator consisting of two stator yokes disposed to oppose to each other, each stator yoke having a soft magnetic metal plate folded to form claw poles half in number of the number of poles of the permanent magnet rotor and combining these claw poles, and a cylindrical coil which is positioned between the stator yokes and excites the stator, wherein among claw poles Xx, Yy, . . . of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, . . . connecting the midpoints of each claw pole Xx, Yy, . . . are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to the claw pole Yy is formed to be smaller than claw pole pitch d from the claw pole Yy to the claw pole Xx, and is characterized by setting a ratio (a/p) of the claw pole width a and the pole pitch p, a ratio (b/a) of the claw pole width a and the claw pole width b, and a ratio (c/d) of the claw pole pitch c and the claw pole pitch d to fall in a predetermined range, so that an starting torque can be generated.

Meaning of forming a pair of claw poles by two adjacent claw poles Xx, Yy among claw poles Xx, Yy, . . . is as follows. Since a row of claw poles Xx, Yy, . . . is annular, it is not clear which one should be determined to be a base point and, therefore, it is necessary to establish a base point for a proper order to determine a>b, c<d.

A method for driving a brushless DC motor according to this invention, in a brushless DC motor consisting of a cylindrical or segment shaped permanent magnet rotor which has N and S poles alternately magnetized in multiple electrodes at an equal pitch in the circumferential direction, a stator consisting of two stator yokes disposed to oppose to each other, each stator yoke having a soft magnetic metal plate folded to form claw poles half in number of the number of poles of the permanent magnet rotor and combining these claw poles, and an annular coil sandwiched by the stator yokes and for exciting the stator, wherein among claw poles Xx, Yy, . . . of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, . . . connecting the midpoints of each claw pole Xx, Yy, . . . are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to th claw pole Yy is formed to be smaller than claw pole pitch d from the claw pole Yy to the claw pole Xx, is characterized by switching the coil current at a position at a high peak of absolute quantity or in the vicinity thereof among a plurality of positive peaks of the cogging torque.

In this specification, "switching of coil's electric current" means to change the direction of current flowing to the coil when the motor is rotated by a single-phase bipolar drive and to change coils to which current is flown when rotated by two-phase, three-phase, . . . unipolar drive.

Further, a method for driving a brushless DC motor according to this invention, in a brushless DC motor consisting of a cylindrical or segment shaped permanent magnet rotor which has N and S poles alternately magnetized in multiple electrodes at an equal pitch in the circumferential direction, a stator consisting of two stator yokes disposed to oppose to each other, each stator yoke having a soft magnetic metal plate folded to form claw poles half in number of the number of poles of the permanent magnet rotor and combining these claw poles, and an annular coil sandwiched by the stator yokes and for exciting the stator, wherein among claw poles Xx, Yy, . . . of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, . . . connecting the midpoints of each claw pole Xx, Yy, . . . are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to the claw pole Yy is formed to be smaller than claw pole pitch d from the claw pole Yy to the claw pole Xx, is characterized by switching the coil current at a position where the excited torque generated by the coil current becomes zero or in its vicinity.

Further, a method for driving a brushless DC motor according to this invention, in a brushless DC motor consisting of

- a cylindrical or segment shaped permanent magnet rotor which has N and S poles alternately magnetized in multiple electrodes at an equal pitch in the circumferential direction,
- a stator consisting of two stator yokes disposed to oppose to each other, each stator yoke having a soft magnetic metal plate folded to form claw poles half in number of the number of poles of the permanent magnet rotor and combining these claw poles, and
- an annular coil sandwiched by the stator yokes and for exciting the stator, wherein
- among claw poles Xx, Yy, ... of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, ... connecting the midpoints of each claw pole Xx, Yy, ... are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to the claw pole Yy is formed to be smaller than claw pole pitch d from the claw pole Yy to the claw pole Xx, is characterized by
- switching the coil current in a vicinity of a positive peak of the cogging torque and giving a no-current passing period when switching the coil current.

And a brushless DC motor of this invention comprises

- a cylindrical or segment shaped permanent magnet rotor which has N and S poles alternately magnetized in multiple electrodes at an equal pitch in the circumferential direction,
- a stator consisting of two stator yokes disposed to oppose to each other, each stator yoke having a soft magnetic metal plate folded to form claw poles half in number of the number of poles of the permanent magnet rotor and combining these claw poles, and
- a cylindrical coil which is positioned between the stator yokes and excites the stator, wherein
- among claw poles Xx, Yy, ... of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, ... connecting the midpoints of each claw pole Xx, Yy, ... are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to the claw pole Yy is formed to be smaller than claw pole pitch d from the claw pole Yy to the claw pole Xx, and is characterized by
- setting a ratio (a/p) of the claw pole width a and the pole pitch p, a ratio (b/a) of the claw pole width a and the claw pole width b, and a ratio (c/d) of the claw pole pitch c and the claw pole pitch d to fall in a predetermined range, so that the rotational speed fluctuation can be reduced.

Further, a brushless DC motor of this invention comprises

- a cylindrical or segment shaped permanent magnet rotor which has N and S poles alternately magnetized in multiple electrodes at an equal pitch in the circumferential direction,
- a stator consisting of two stator yokes disposed to oppose to each other, each stator yoke having a soft magnetic metal plate folded to form claw poles half in number of the number of poles of the permanent magnet rotor and combining these claw poles, and
- a cylindrical coil which is positioned between the stator yokes and excites the stator, wherein
- among claw poles Xx, Yy, ... of the two stator yokes X, Y, two adjacent claw poles Xx, Yy form a pair of claw poles, width a of the claw pole Xx and width b of the claw pole Yy are not equal; claw pole pitch c and claw pole pitch d of claw pole pitches c, d, c, d, ... connecting the midpoints of each claw pole Xx, Yy, ... are not equal; among claw poles Xx, Yy of the each claw pole set, width a of claw pole Xx residing in the rotating direction of the permanent magnet rotor is formed to be larger than width b of the other claw pole Yy, and claw pole pitch c from the claw pole Xx to the claw pole Yy is formed to be smaller than claw pole pitch d from the claw pole Yy to the claw pole Xx, and is characterized by
- setting a ratio (a/p) of the claw pole width a and the pole pitch p, a ratio (b/a) of the claw pole width a and the claw pole width b, and a ratio (c/d) of the claw pole pitch c and the claw pole pitch d to fall in a predetermined range, so that an starting torque can be generated and the rotational speed fluctuation can be reduced.

BRIEF DESCRIPTION OF THE DRAWINGS

[FIG. 5] Diagrams showing a development elevation of claw poles and a torque curve.

[FIG. 6] Diagrams showing a development elevation of claw poles and a torque curve.

[FIG. 7] Diagrams showing a development elevation of claw poles and a torque curve.

[FIG. 8] Diagrams showing a development elevation of claw poles and a torque curve.

[FIG. 9] Diagrams showing a development elevation of claw poles and a torque curve.

[FIG. 10] Diagrams showing a development elevation of claw poles and a torque curve.

[FIG. 11] Diagrams showing a development elevation of claw poles and a torque curve.

[FIG. 12] Diagrams showing a development elevation of claw poles and a torque curve.

[FIG. 13] Diagrams showing a development elevation of claw poles and a torque curve.

[FIG. 14] Diagrams showing a development elevation of claw poles and a torque curve.

[FIG. 21] Drawing showing time charts of a no-current passing circuit.

[FIG. 22] Table showing a self-activation characteristic when a/p=1.0.

[FIG. 23] Table showing a self-activation characteristic when a/p=0.95.

[FIG. 24] Table showing a self-activation characteristic when a/p=0.90.

[FIG. 26] Table showing a self-activation characteristic when a/p=0.80.

[FIG. 27] Table showing a self-activation characteristic when a/p=0.75.

[FIG. 28] Table showing the generated states of nonuniformity of rotation when a/p=1.0.

[FIG. 29] Table showing the generated states of nonuniformity of rotation when a/p=0.95.

[FIG. 32] Table showing the generated states of nonuniformity of rotation when a/p=0.80.

[FIG. 33] Table showing the generated states of nonuniformity of rotation when a/p=0.75.

BEST MODE FOR CARRYING OUT THE INVENTION

Figure 1:
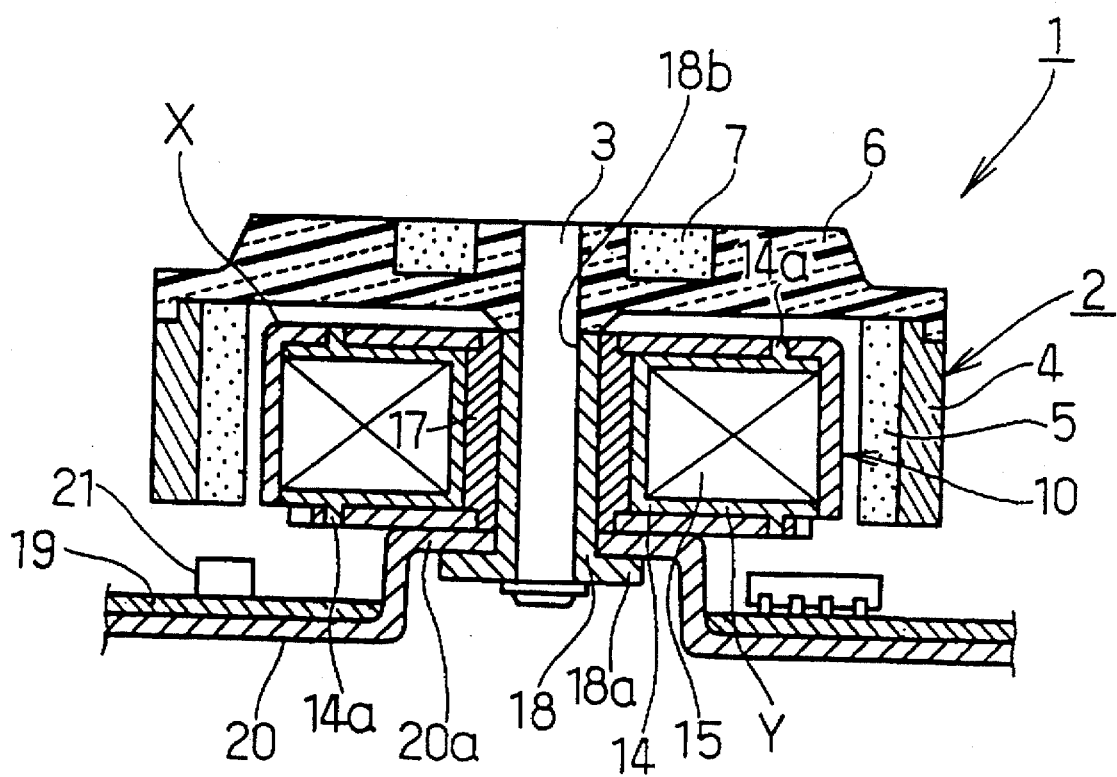
[FIG. 1] A vertical sectional view showing a brushless DC motor.

In FIG. 1, a brushless DC motor 1 is constructed by combining a rotor 2 and a stator 10, and the rotor 2 consists of a cup-shaped back yoke 4, an annular permanent magnet 5 which is attached to the inner wall of the back yoke, and a shaft 3 which is press fitted to the center of the back yoke 4. The reference numeral 6 represents a turn table and 7 a chucking magnet.

Figure 2:
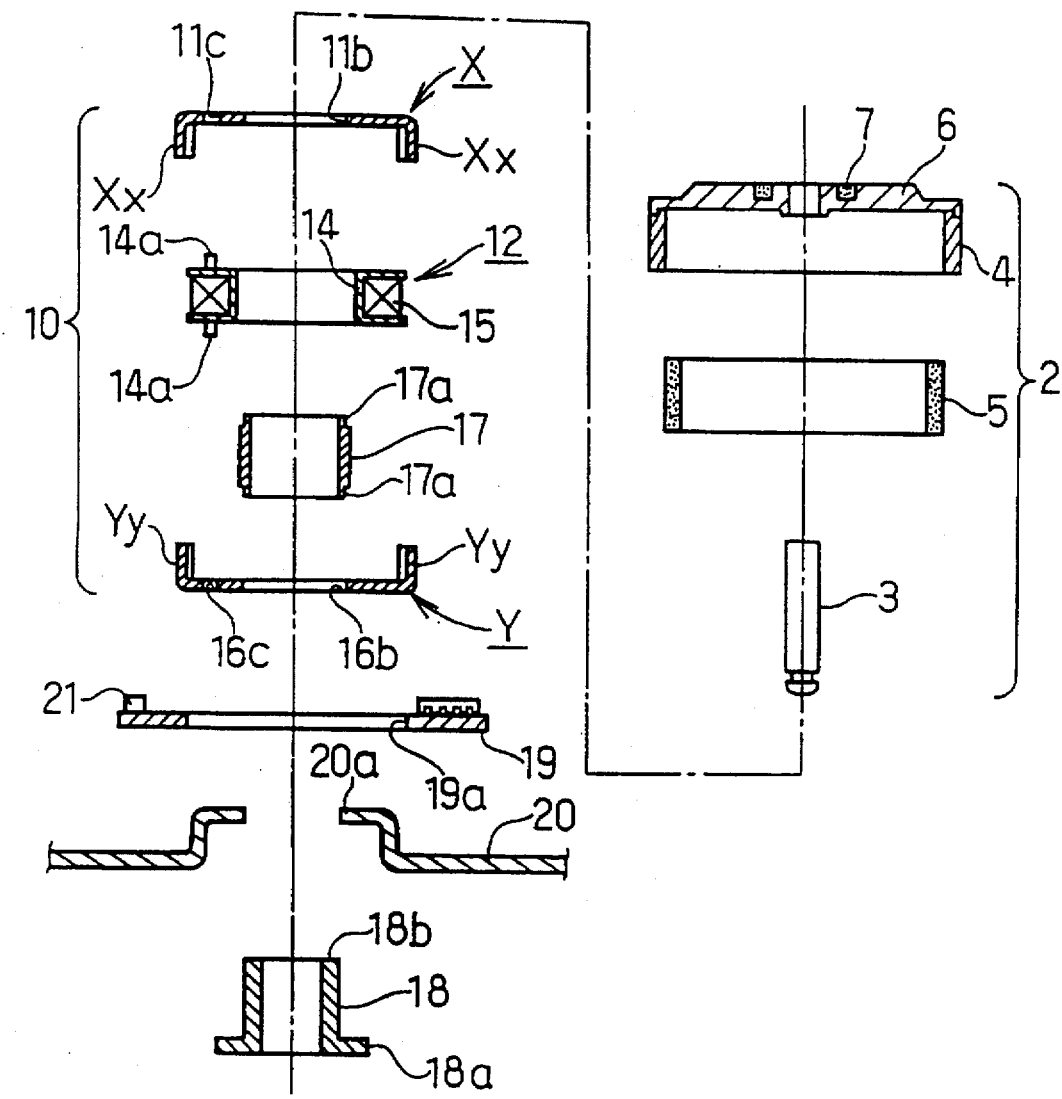
[FIG. 2] An exploded sectional view showing a brushless DC motor.

The stator 10 consists of a first stator yoke X shown at the upper part, a coil 12, and a bearing 18 which supports a stator yoke Y shown at the lower part, a sleeve 17 and the shaft 3 in FIG. 1 and FIG. 2.

Both the stator yokes X, Y are made of a soft, magnetic metallic plate, which is stamped out, into a certain shape whose portion extending radially is then bent at right angles to form claw poles Xx, Yy, . . . have the sleeve 17 to which the coil 12 is mounted therebetween, so that the claw poles Xx, Yy, . . . are alternately disposed in the circumferential direction.

The coil 12 consists of a resin bobbin 14 having a flange at each end and a winding 15 wound thereon. The above sleeve 17 is formed in a cylindrical shape and has a fitting part 17a formed in a projected shape at each end, which is fitted into fitting holes 11b, 16b formed at the center of the stator yokes X, Y. Besides, a pin 14a is projected from each flange of the bobbin 14, and holes 11c, 16c to be connected with the pins 14a are respectively formed in the stator yokes X, Y to determine the relative positions of the stator yokes X, Y in the circumferential direction when the stator yokes X, Y are assembled with the coil 12.

And, after assembling the stator 10 from the first stator yoke X, the coil 12, the sleeve 17, and the second stator yoke Y, a fitting hole 19a of a circuit substrate 19 is fitted to a fitting projection 20a formed in a convex shape at the center of a base plate 20, and the bearing 18 is inserted from below the fitting projection 20a to assemble an entire motor. The bearing 18 has a flange 18a formed at the bottom, which is larger than the hole of the fitting projection 20a of the base plate 20, and is inserted upward from below into the sleeve 17, then is fixed within the sleeve 17 by caulking a top opening 18b which is enlarged with a jig. The reference numeral 21 represents a hole element which is a sensor for detecting the position of a magnetic pole of the rotor.

Furthermore, the circuit substrate 19 disposed on the base plate 20 is fixed by screwing through holes previously formed in the circuit substrate 19 and the base plate 20 so that the hole element 21 disposed on the circuit substrate 19 is positioned at a prescribed position.

Figure 19:
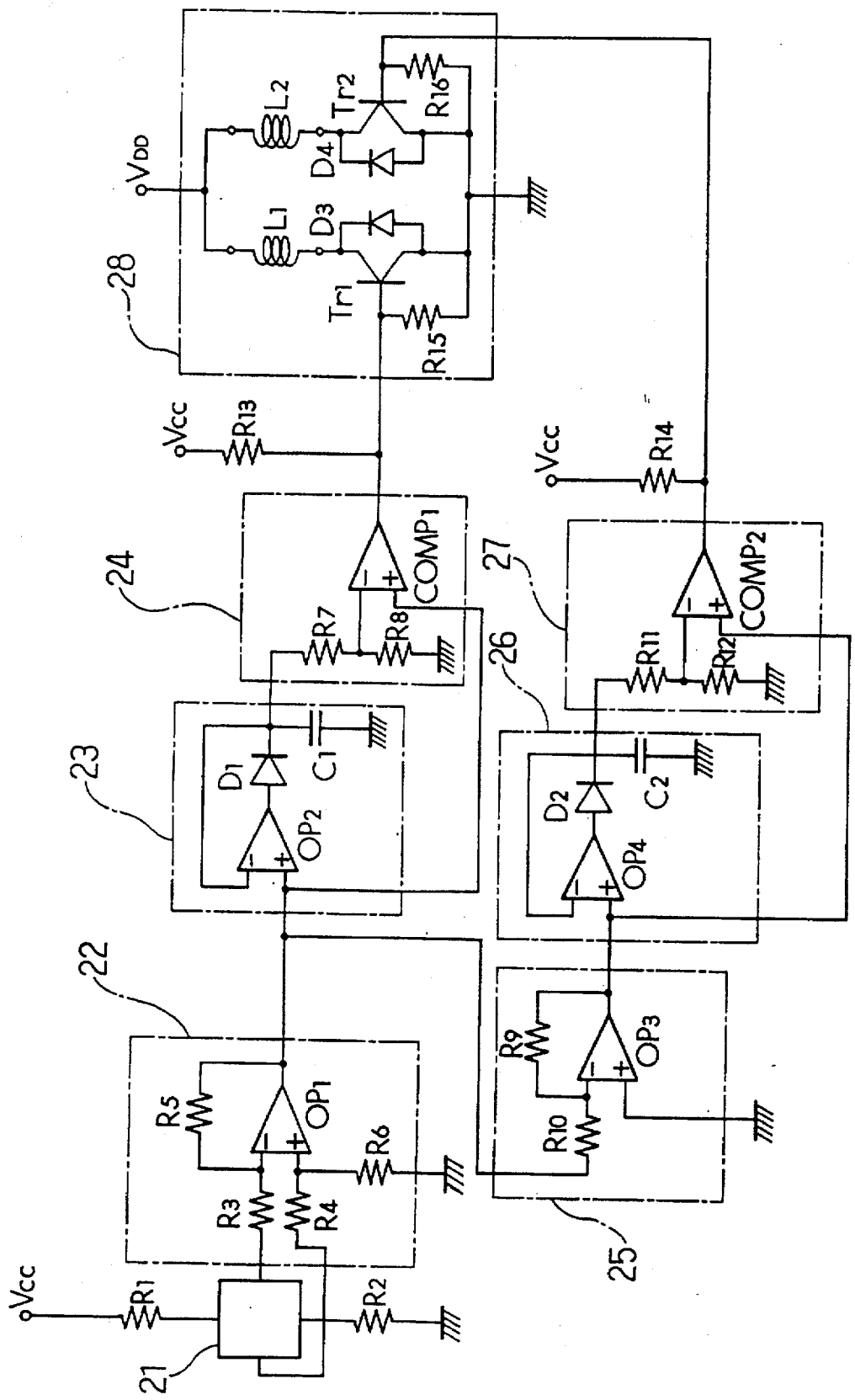
[FIG. 19] Two-phase unipolar type motor drive circuit using a no-current passing circuit.

As described afterward, since switching of the coil's current by the sensor is conducted at a high peak of absolute quantity or in the vicinity thereof among a plurality of positive peaks of the cogging torque, the position of the hole element 21 is determined to suit it. The position of the hole element 21 on the circuit substrate 19 is basically the same as shown in FIG. 19 and is set at a position deviated in the direction opposite from the rotating direction by 0 to 90 degrees in electric angle from the position of a stable point (right stable point of the torque curve shown in FIGS. 5 to 14 to be described afterward) in a non-excited state.

Figure 3:
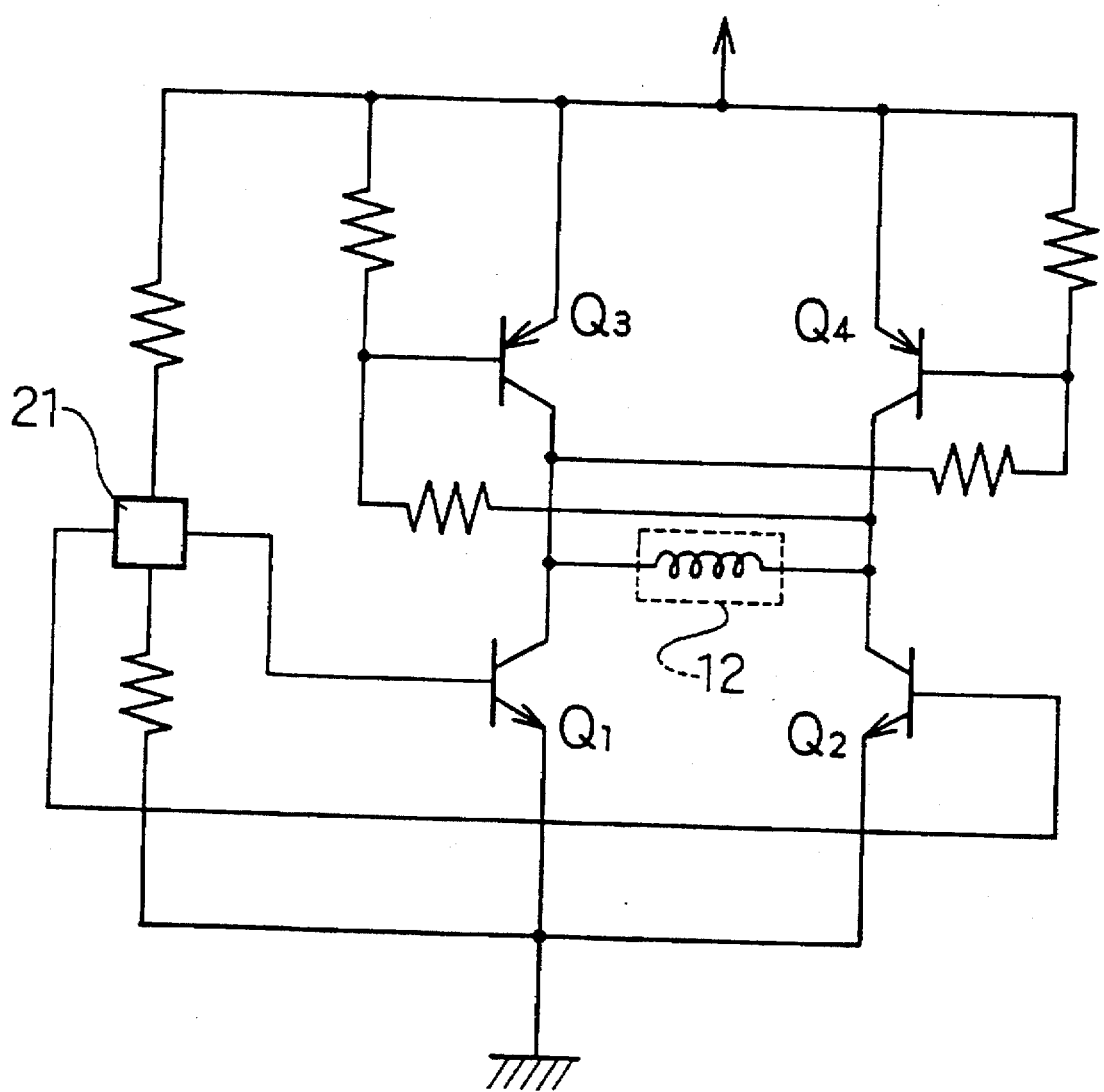
[FIG. 3] A circuit diagram showing one example of the driving circuit of a brushless DC motor.

FIG. 3 is a circuit diagram of a single-phase bipolar drive showing one example of a driving circuit of the brushless DC motor of this invention, where the hole element 21 detects S and N poles of the permanent magnet to generate an output signal, transistors Q1, Q4 or Q2, Q3 are turned on or off accordingly, and the coil 12 is alternately flown with current to excite the stator 10.

Figure 4:
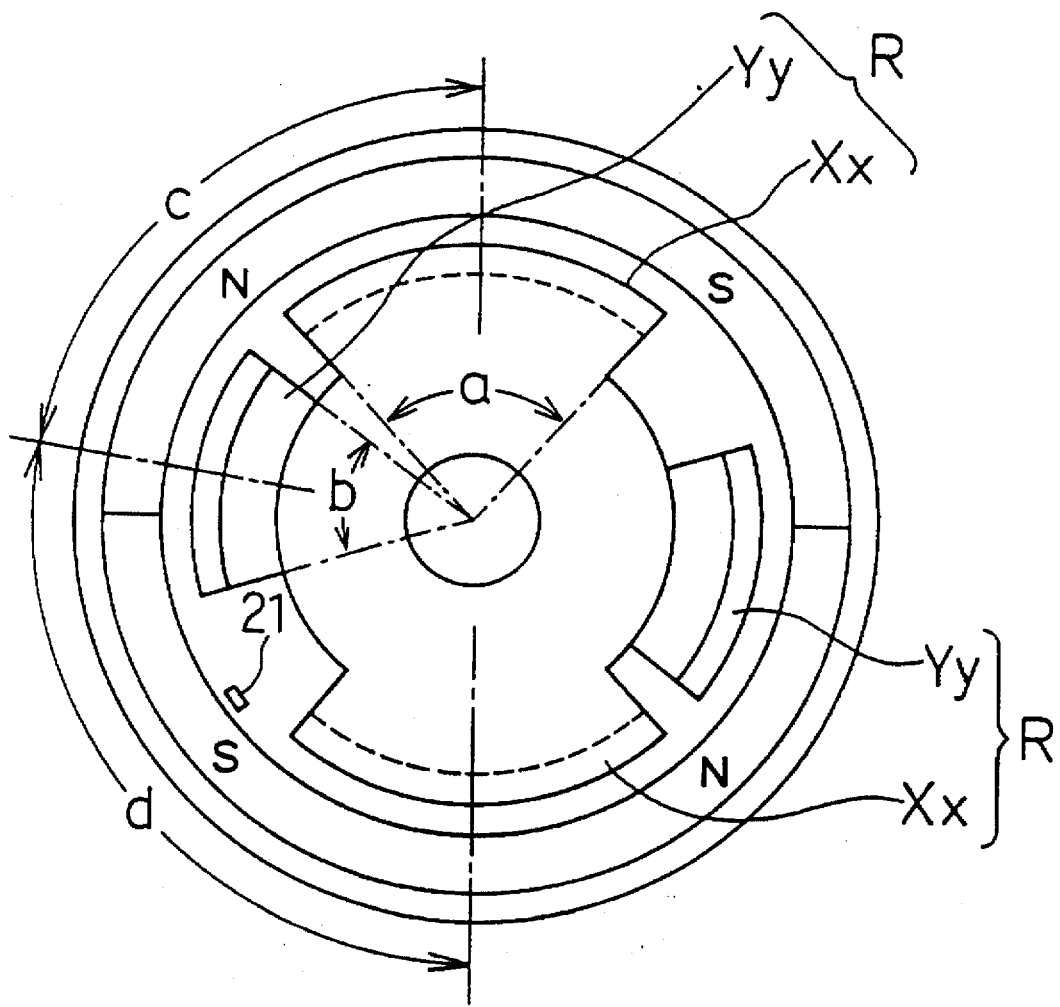
[FIG. 4] A plan view showing a stator yoke and a magnet.

In this invention, a pair of claw poles R is set by two adjacent claw poles Xx, Yy among claw poles Xx, Yy, . . . of the two stator yokes X, Y as shown in FIG. 4. In this example, the motor has a four-pole structure and, therefore, two pairs of claw poles R are provided.

And, claw pole width a of the claw pole Xx and claw pole width b of the claw pole Yy are determined not to be equal, claw pole pitch c and claw pole pitch d of claw pole pitches c, d, c, d, . . . connecting the midpoints of each claw poles Xx, Yy, . . . are determined not to be equal, the claw pole width a of the claw pole Xx on the rotating direction of the permanent magnet rotor among the claw poles Xx, Yy of the each pair of claw poles is formed to be larger than the claw pole width b of the other claw pole Yy, and the claw pole pitch c from the claw pole Xx to the claw pole Yy is formed to be smaller than the claw pole pitch d from the claw pole Yy to the claw pole Xx.

The structure of this invention will be described in comparison with a conventional one which combines claw poles having an equal claw pole width at an equal interval, so that the characteristics of this invention will be fully understood. The brushless DC motor of this invention, according to any embodiment of the following (1) to (10), has the claw pole width a of the claw pole Xx residing on the rotating direction of the permanent rotor between the claw poles Xx, Yy of the each pair of claw poles formed to be larger than the claw pole width b of the claw pole Yy, and the claw pole pitch c from the claw pole Xx to the claw pole Yy formed to be smaller than the claw pole pitch d from the claw pole Yy to the claw pole Xx. Specifically, among the above a, b, c and d, it is determined to be a>b and c<d, and switching of the coil current is made at a positive peak of cogging torque curve or in its vicinity to be described afterward.

(1) One claw pole Xx is remained as it is and the back part of the other claw pole Yy in the rotating direction is notched (see FIG. 5). In this case, a symbol Xx is given to a lower claw pole and a symbol Yy to an upper claw pole, hatched portions represent notched portions, and a row of magnets is indicated at the position of a stable point. The magnet (rotor) rotates to the left direction in the drawing. In the torque curve shown in the lower part, the solid line represents a cogging torque (torque due to attraction by the magnet and the stator yoke under the non-excited condition), the dotted line represents a generated torque (torque which is generated when electricity is flown, and the sum of the cogging torque and the exited torque generated by the coil current), mark o represents a stable point, mark Δx represents an unstable point, and mark x represents a coil current switching point. As obvious from this torque curve, a distance e between the stable points shown on the left and a distance f between the stable points shown on the right are not equal (e<f), and there is a large positive peak on the right of the torque curve. The coil current is switched at this peak or in its vicinity (the same is applied to the following case). The excited torque (quantity obtained by subtracting the cogging torque shown by the solid line from the generated torque shown by the dotted line) is inverted by switching the coil current but, in this case shown in the drawing, the inverted quantity is very small as compared with the claw pole torque, so that a negative torque is not generated and therefore a dead point is not generated. In this torque curve, the absolute values at the peaks on both sides of the middle stable point of the claw pole torque curve are lower then the peaks near the right and left stable points. In other words, the inclines of the curve at the right and left stable points are greater than that at the middle stable point. In this sense, the middle stable point is a weak stable point and the right and left stable points a strong stable point.

(2) In FIG. 6, claw pole Xx (will be referred to as the lower teeth) are remained as they are and the front and back parts of the other claw pole Yy (will be referred to as the upper teeth) in the rotating direction are notched, but the front part is notched larger than the front part. In this case, the characteristics are almost the same with the aforementioned (1). But, notching the front part of the claw pole Yy is not desirable because a drop of the cogging torque after the middle stable point is sharp in the torque curve of FIG. 6 (in other words, the middle stable point is emphasized).

(3) In FIG. 7, the back part of the lower teeth (claw pole Xx) in the rotating direction of the rotor is increased and the upper teeth (claw pole Yy) are remained as they are. In this case, since the width of the lower teeth is increased, the middle stable point is emphasized. And it is known that when the width of the lower teeth is increased, a torque in the positive direction of the rotating direction when switching has a tendency to be obtained with difficulty.

(4) In FIG. 8, the back part of the lower teeth (claw pole Xx) in the rotating direction is increased and the back part of the upper teeth (claw pole Yy) in the rotating direction is notched. This is a combination of the aforementioned (1) and (3).

(5) In FIG. 9, the back part of the lower teeth (claw pole Xx) in the rotating direction is increased and the front and back parts of the upper teeth (claw pole Yy) in the rotating direction are notched, but the back part of the upper teeth (claw pole Yy) is notched larger than the front part. This is a combination of the aforementioned (2) and (3).

(6) In FIG. 10, the front and back parts of the lower teeth in the rotating direction are increased and the upper teeth are remained as they are, but the back part of the lower teeth is increased greater than the front part.

(7) In FIG. 11, the front and bank parts of the lower teeth in the rotating direction are increased in the same level and the back part of the upper teeth is notched.

(8) In FIG. 12, the front and back parts of the lower teeth in the rotating direction are increased in the same level and the front and back parts of the upper teeth in the rotating direction are notched, but the back part of the upper teeth is notched larger than the front part.

(9) In FIG. 13, the front and bank parts of the lower teeth in the rotating direction are increased and the back part of the upper teeth in the rotating direction is notched, but the back of the upper teeth is increased greater than the front part.

(10) In FIG. 14, the front and back parts of the lower teeth in the rotating direction are increased and the front and back parts of the upper teeth in the rotating direction are notched, but the back of the lower teeth is increased greater than the front part and the back of the upper teeth is notched larger than the front part.

It can be said in view of the aforementioned (1) to (10) that when the brushless DC motor has the above structure, intervals of the stable points and unstable points are not equal different from a conventional equal interval, and the generated torque cycle of the cogging torque is formed in large and small torque waves. And, it has been clarified that by switching the coil current at a high peak of absolute quantity or in the vicinity thereof among a plurality of positive peaks of the cogging torque, even if the excited torque is changed from positive to negative by changing the coil current, this is compensated by the positive cogging torque, so that the generation of the negative torque at a point where polarity is changed can be eliminated, resulting in preventing the generation of a dead point.

Figure 15:
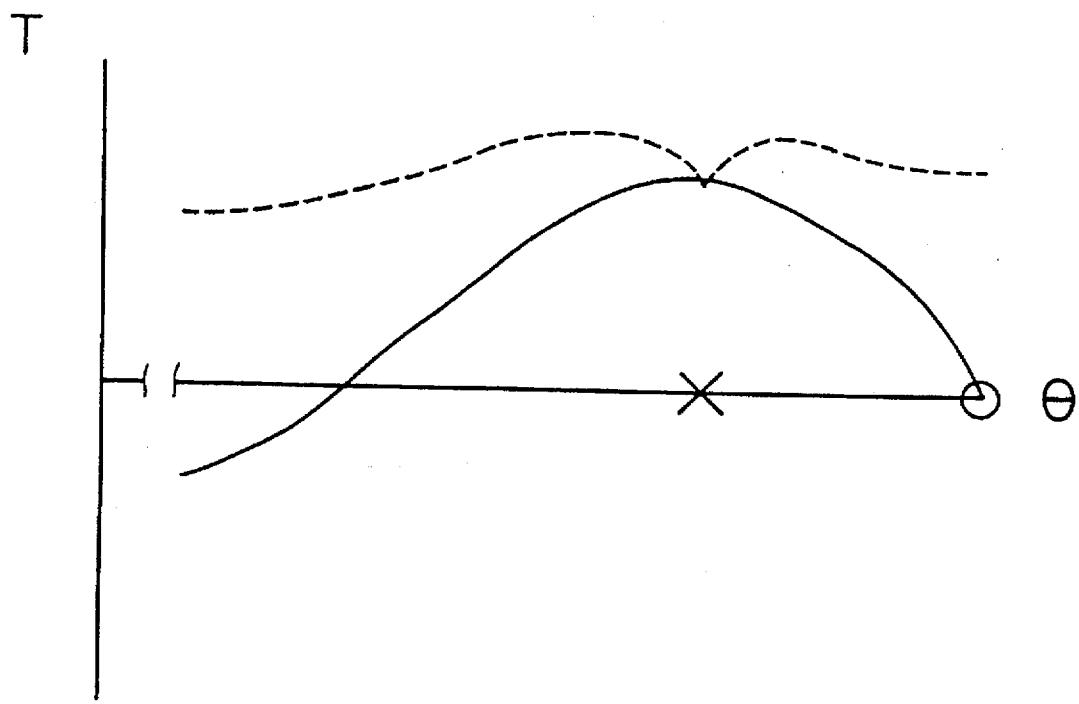
[FIG. 15] A graph showing a torque curve.
Figure 16:
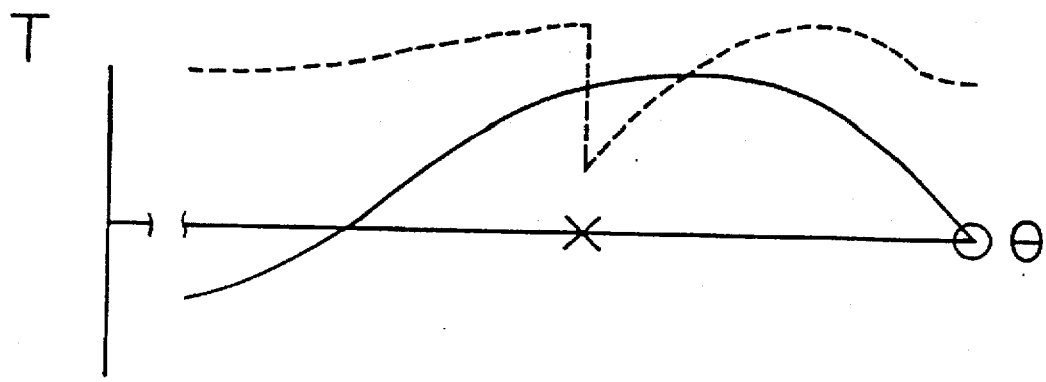
[FIG. 16] A graph showing a torque curve.
Figure 17:
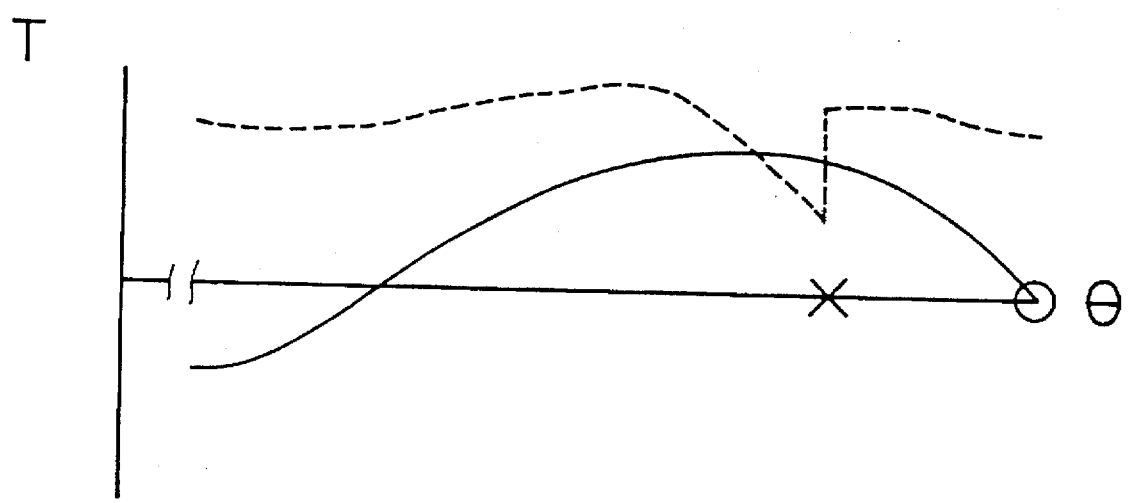
[FIG. 17] A graph showing a torque curve.

To be short, in this invention, the generated torque is equal to a cogging torque at a switching point of the coil current as shown in FIG. 15 and, therefore, the excited torque (a difference between the generated torque and the cogging torque) is zero. On the other hand, in an ordinary motor, the point, zero of the excited torque agrees with the point zero of the cogging torque. It is known that too early switching of the coil current results in the state shown in FIG. 16 and too late switching results in the state shown in FIG. 17. That is to says that this invention has an advantage that the excited torque is hardly converted into negative, by switching the coil current at a high peak of absolute quantity or in the vicinity thereof among a plurality of positive peaks of the cogging torque.

As obvious from FIG. 15, when the coil current is switched at, a point, that the excited torque is zero, a change in torque is smallest, so that it is preferable to switch the coil current at this position or in its vicinity.

Figure 37A:
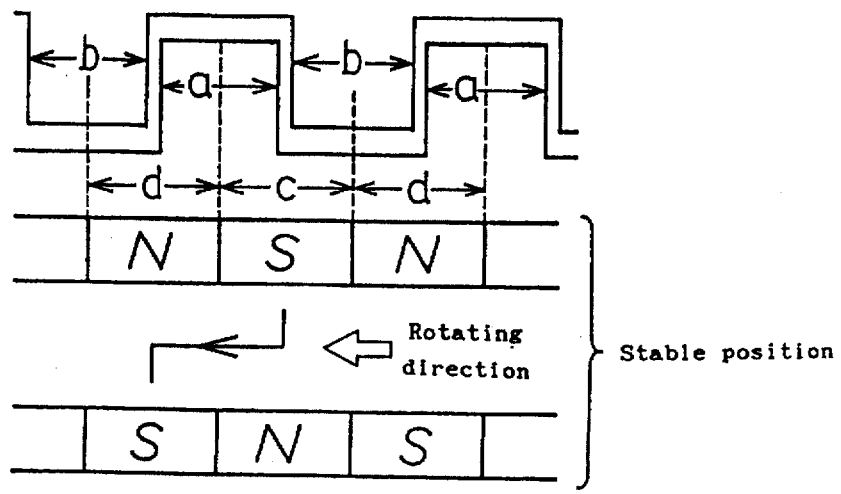
[FIG. 37] Diagrams showing a development elevation of claw poles and a torque curve.
Figure 37B:
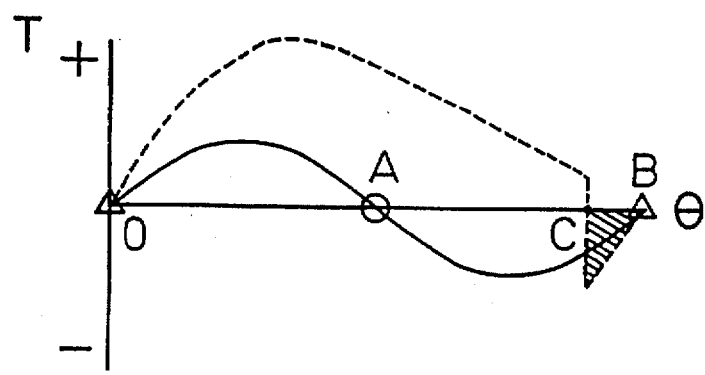

It should be noted that when the claw pole width is broad, a torque at switching is likely to be negative, and when it is further broadened, the torque curve shown in FIG. 37 is generated.

Figure 18:
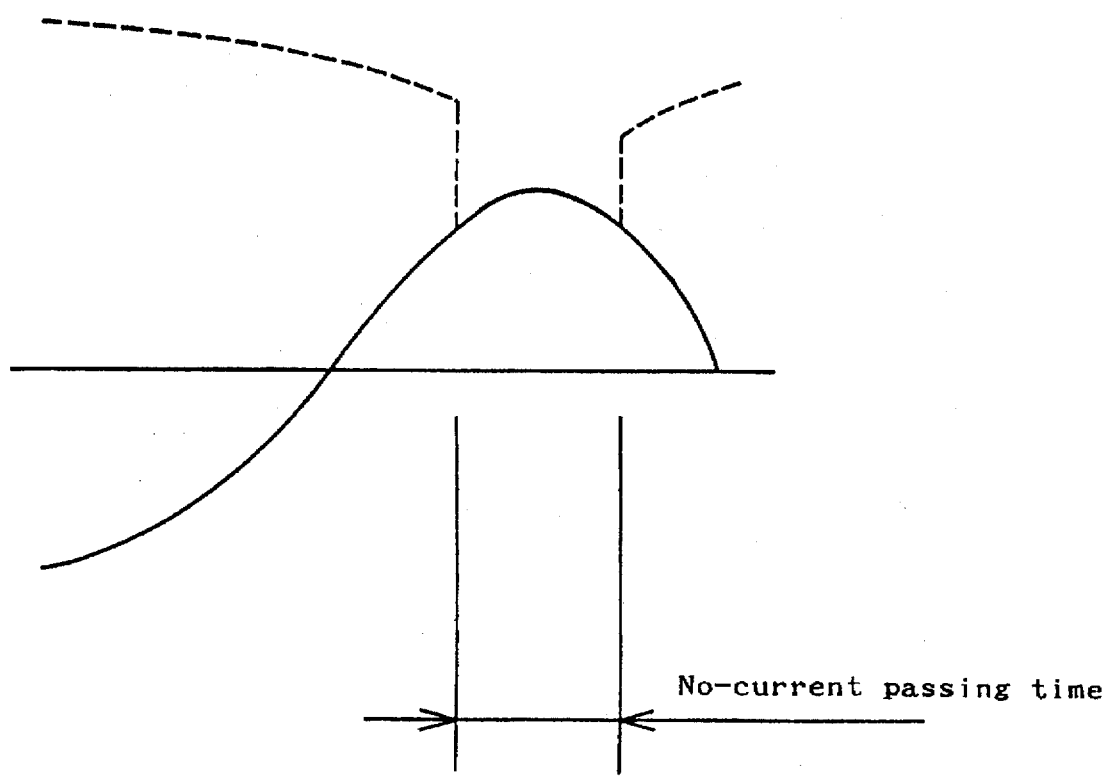
[FIG. 18] A graph showing a torque curve.

FIG. 18 shows that the coil current is switched at the vicinity of a positive peak of the cogging torque and no-current passing time is provided to switch the coil current. This example is different from a conventional control circuit and has a control circuit which can keep the no-current passing time at a prescribed level even if the voltage value of the detection signal of the hole element changes.

Figure 20:
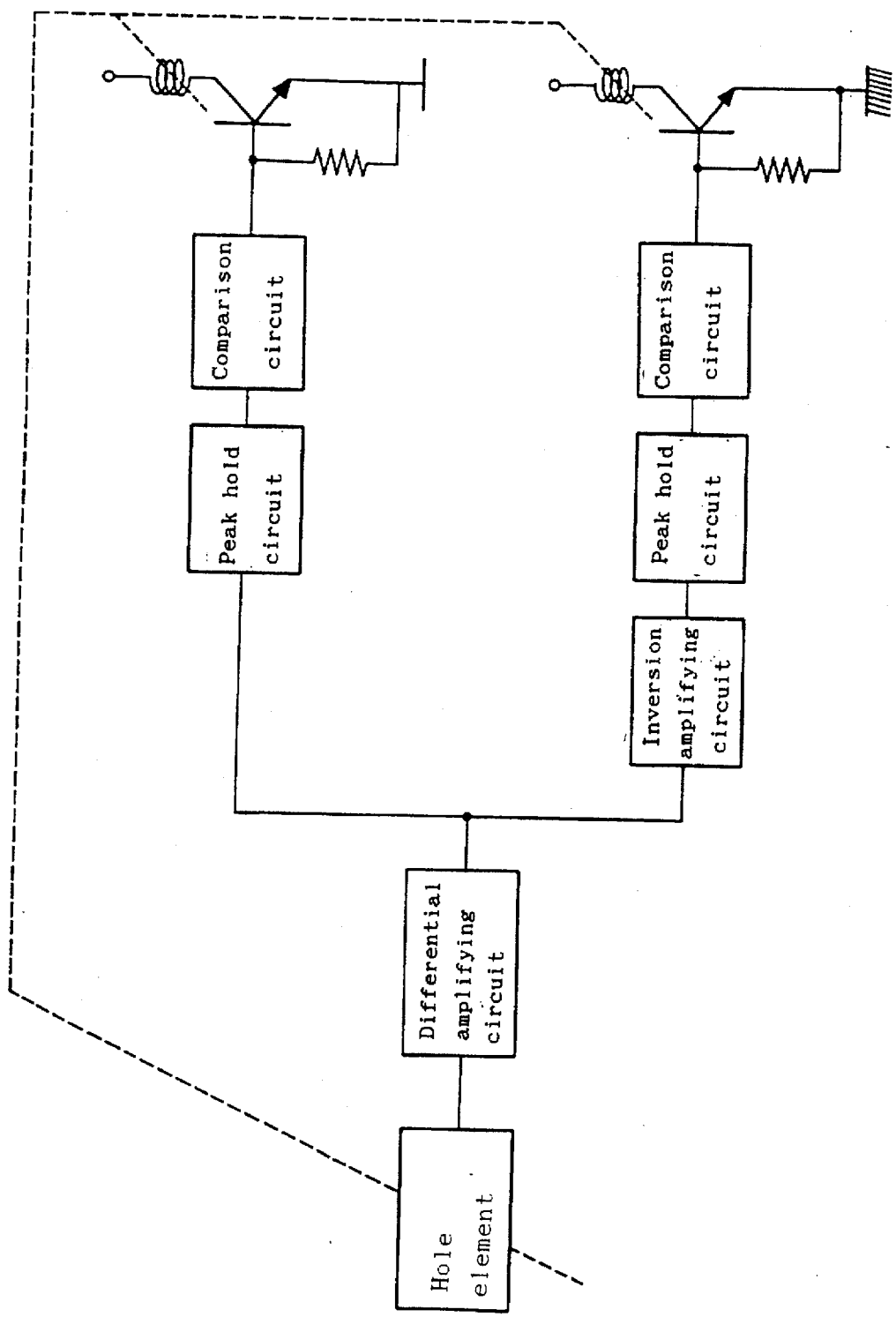
[FIG. 20] A block diagram of a no-current passing circuit.

FIG. 19 is a diagram showing a two-phase unipolar type motor drive circuit using a no-current passing circuit. In this motor drive circuit, a differential amplifying circuit 22 for amplifying the output of a hole element 21 consists of an operation amplifier OP1 and resistors R3 to R6, and the differential amplifying circuit 22 is branched into a peak hold circuit 23 which consists of an operation amplifier OP2, a diode D1 and a capacitor C1, and a comparison circuit 24 which consists of resistors R7, R8 and a comparator COMP1 on one hand, and an inversion amplifying circuit 25 which consists of an operation amplifier OP3 and resistors R9, R10, and a pear hold circuit 26 which consists of an operation amplifier OP4, a diode D2 and a capacitor C2, and a comparison circuit, 27 which consists of resistors R11, R12 and a comparator COMP2 on the other hand, and they are connected to a drive circuit 28. Tr1 and Tr2 stand for transistors, L1 and L2 for coils of the motor, D3 and D4 for diodes, R1, R2, R13 to R16 for resistors, Vcc for a power source of the drive circuit, and VDD for a motor power source. And, FIG. 20 is a block diagram showing an A.L.C. (automatic level control) no-current passing circuit, and FIG. 21 is a drawing showing time charts of the no-current passing circuit.

In this example, the output of the hole element 21 has a noise component removed and a signal component alone subjected to voltage amplification in the differential amplifying circuit 22 (see FIG. 21 (a), peaks (VH) of the waveform on the plus side are held by the peak hold circuit 23 (see FIG. 21 (b)), and a transistor drive waveform having a no-current passing period is formed by the comparison circuit. 24 (see FIG. 21 (c)). On the other hand, the waveform on the minus side is inverted by the inversion amplifying circuit 25, and a transistor drive waveform having a no-current passing period is formed by the peak hold circuit. 26 and the comparison circuit 27 (see FIG. 21 (d), (e)). Therefore, according to the motor drive circuit of this example, since the comparison is always made at a predetermined ratio (VH/n, VL/n), the no-current passing period can be held at a certain level even if the voltage values VH, VL of the detected signal of the hole element change.

Thus, a no-current passing time is provided to switch the coil current and the coil current is switched in the vicinity of a positive peak of the cogging torque, so that a drop of a torque due to switching as in a conventional case (see FIG. 37) can be prevented even if a switching point of the coil's current is deviated due to an assembling error in the production of a motor. And, the self-activation can be fully improved accordingly.

Figure 38:
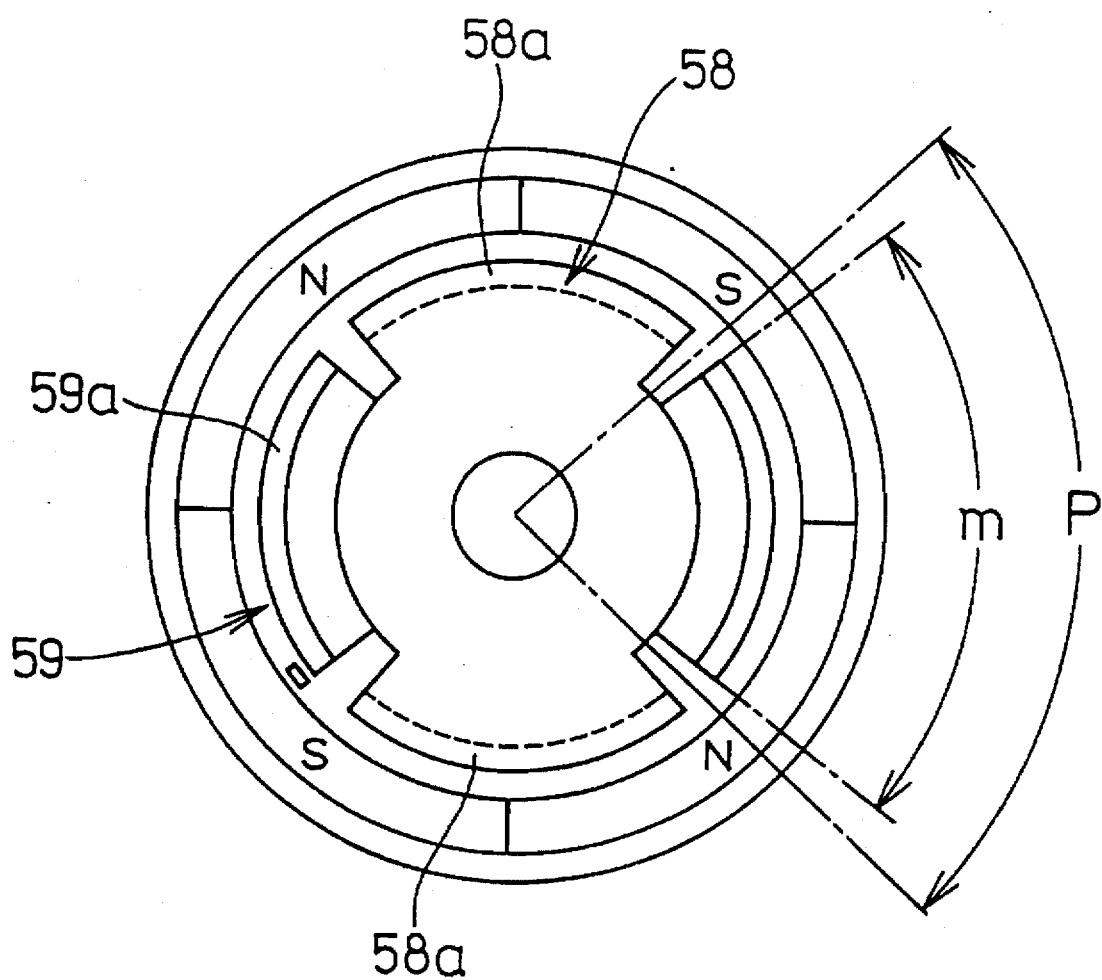
[FIG. 38] A plan view showing a stator yoke and a magnet.

Then, the inventors have made experiments on a self-activation characteristic by variously combining b/a values and c/d values at each a/p value among claw pole width a of claw pole Xx, claw pole width b of claw pole Yy, claw pole pitch c from the claw pole Xx to the claw pole Yy, claw pole pitch d from the claw pole Yy to the claw pole Xx, and pole pitch p (see FIG. 38) or among these a, b, c, d and p on the basis of the following motor specification. The results obtained are shown in FIG. 22 through FIG. 27.

Motor specification:
  Motor structure: radial gap, outer rotor type
  Number of poles: 8
  Motor outer diameter: 14.0 mm
  Motor height: 7.0 mm
  Gap: 0.5 mm
  Rotor magnet: ferrite magnet (BHmax1.4MGOe)

In FIG. 22 through FIG. 27, mark o indicates that there is an activation torque (exceeding 0 gcm) and mark x indicates that there is no activation torque (0 gcm). And, the blank blocks on the left side indicate that a combination is dimensionally impossible.

In FIG. 22, a ratio (a/p) of pole pitch p of the permanent magnet (see FIG. 38) and claw pole width a is 1.0. In this example, when b/a is 0.50 to 0.95, an activation torque is generated when c/d is 0.60 to 0.95.

In FIG. 23, (a/p) is 0.95. In this example, when b/a is 0.50 to 0.95, an activation torque is generated when c/d is 0.56 to 0.91.

In FIG. 24, (a/p) is 0.90. In this example, when b/a is 0.50 to 0.95, an activation torque is generated when c/d is 0.49 to 0.95.

Figure 25:
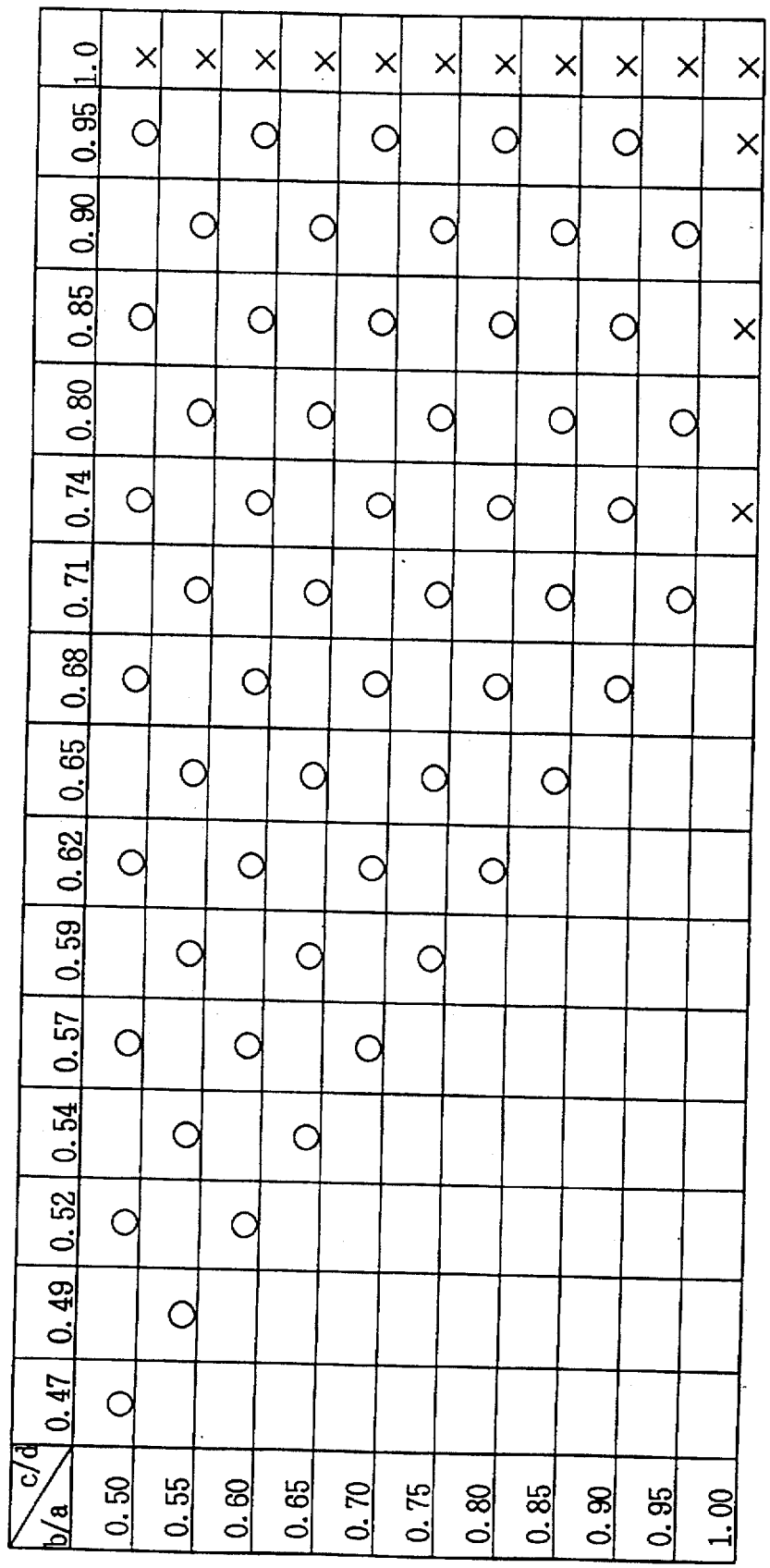
[FIG. 25] Table showing a self-activation characteristic when a/p=0.85.

In FIG. 25, (a/p) is 0.85. In this example, when b/a is 0.50 to 0.95, an activation torque is generated when c/d is 0.47 to 0.95.

In FIG. 26, (a/p) is 0.80. In this example, when b/a is 0.50 to 0.95, an activation torque is generated when c/d is 0.43 to 0.95.

In FIG. 27, (a/p) is 0.75. In this example, when b/a is 0.50 to 0.95, an activation torque is generated when c/d is 0.39 to 0.90.

When (a/p) is 0.7, a good result cannot be obtained. Therefore, (a/p) is desired to exceed 0.7.

Further, the inventors have measured the nonuniformity of rotation by variously combining b/a values and c/d values on the basis of the aforementioned motor specification. To measure the nonuniformity of rotation, an optical encoder was attached to the motor, a constant velocity servo circuit was used, and value Vf represented by the following expression was used.

$$Vf=(\Delta f/fc)*100\%$$

In the above expression, $\Delta f$ stands for a variation of frequency of the servo voltage waveform (or a variation of speed), and fc for a carrier frequency of the encoder at a prescribed rpm. The results obtained are shown in FIG. 28 through FIG. 33.

In FIG. 28 through FIG. 33, mark ⊙ indicates that the nonuniformity of rotation is very little, mark o indicates that there is little nonuniformity of rotation, mark Δ indicates that there are slightly much nonuniformity of rotation, and mark x indicates that there are much nonuniformity of rotation. It has been found that the motor is practically usable when mark ⊙ or ○ is given.

In FIG. 28, a ratio (a/p) of pole pitch p of the permanent magnet and claw pole width a is 1.0. In this example,
  (1) when b/a is 0.50 to 0.90, and c/d is 0.60 to 0.95, and
  (2) when b/a is 0.50 to 0.85, and c/d is 0.60 to 1.00, a motor rotation with less nonuniformity of rotation is obtained.

In FIG. 29, (a/p) is 0.95. In this example, when b/a is 0.50 to 1.00, and c/d is 0.56 to 1.00, a motor rotation with less nonuniformity of rotation is obtained.

Figure 30:
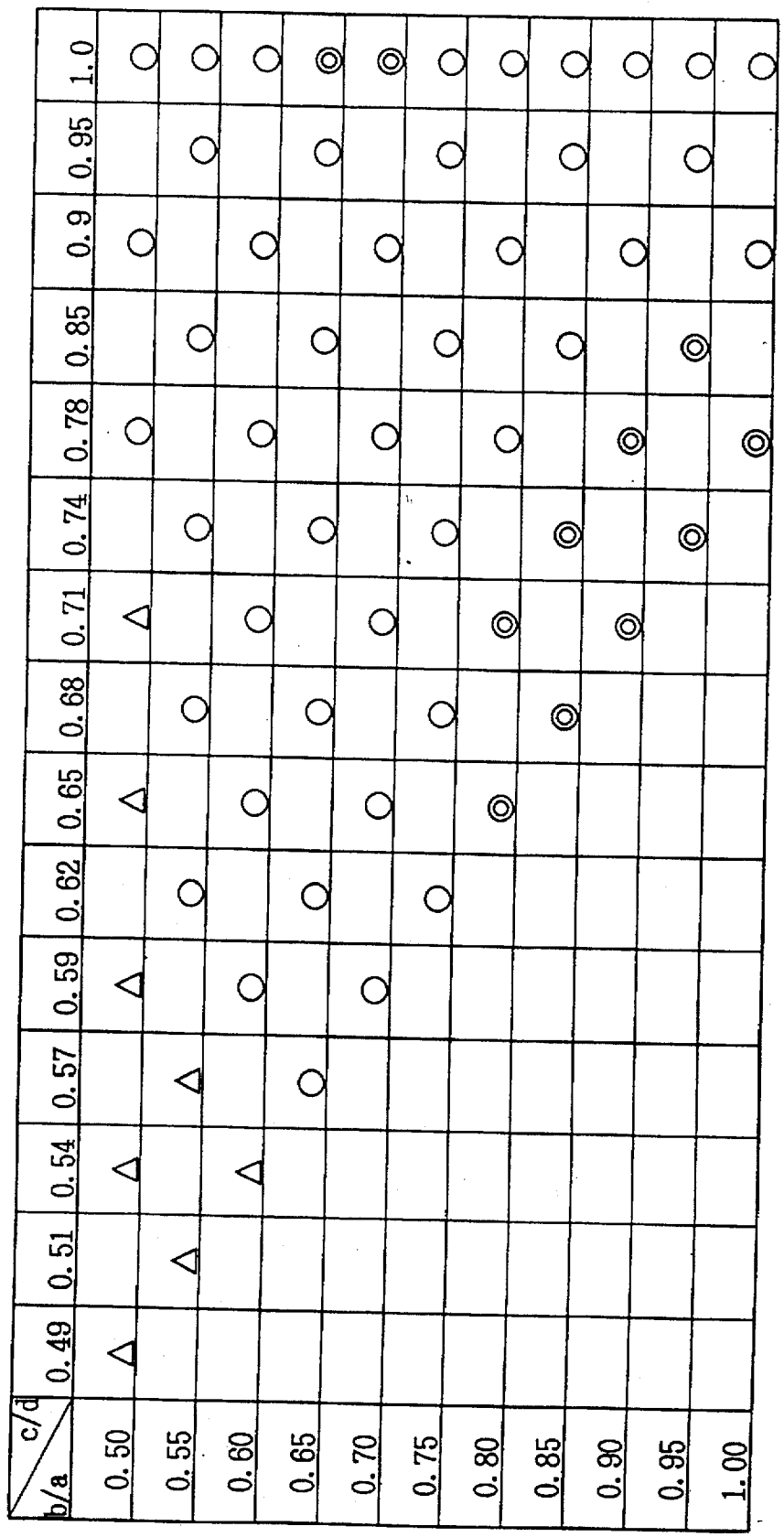
[FIG. 30] Table show ng the generated states of nonuniformity of rotation when a/p=0.90.

In FIG. 30, (a/p) is 0.90. In this example, (1) when b/a is 0.50 to 1.00, and c/d is 0.78 to 1.00, (2) when b/a is 0.55 to 1.00, and c/d is 0.62 to 1.00, (3) when b/a is 0.60 to 1.00, and c/d is 0.59 to 1.00, and (4) when b/a is 0.65 to 1.00, and c/d is 0.57 to 1.00, a motor rotation with less nonuniformity of rotation is obtained.

Figure 31:
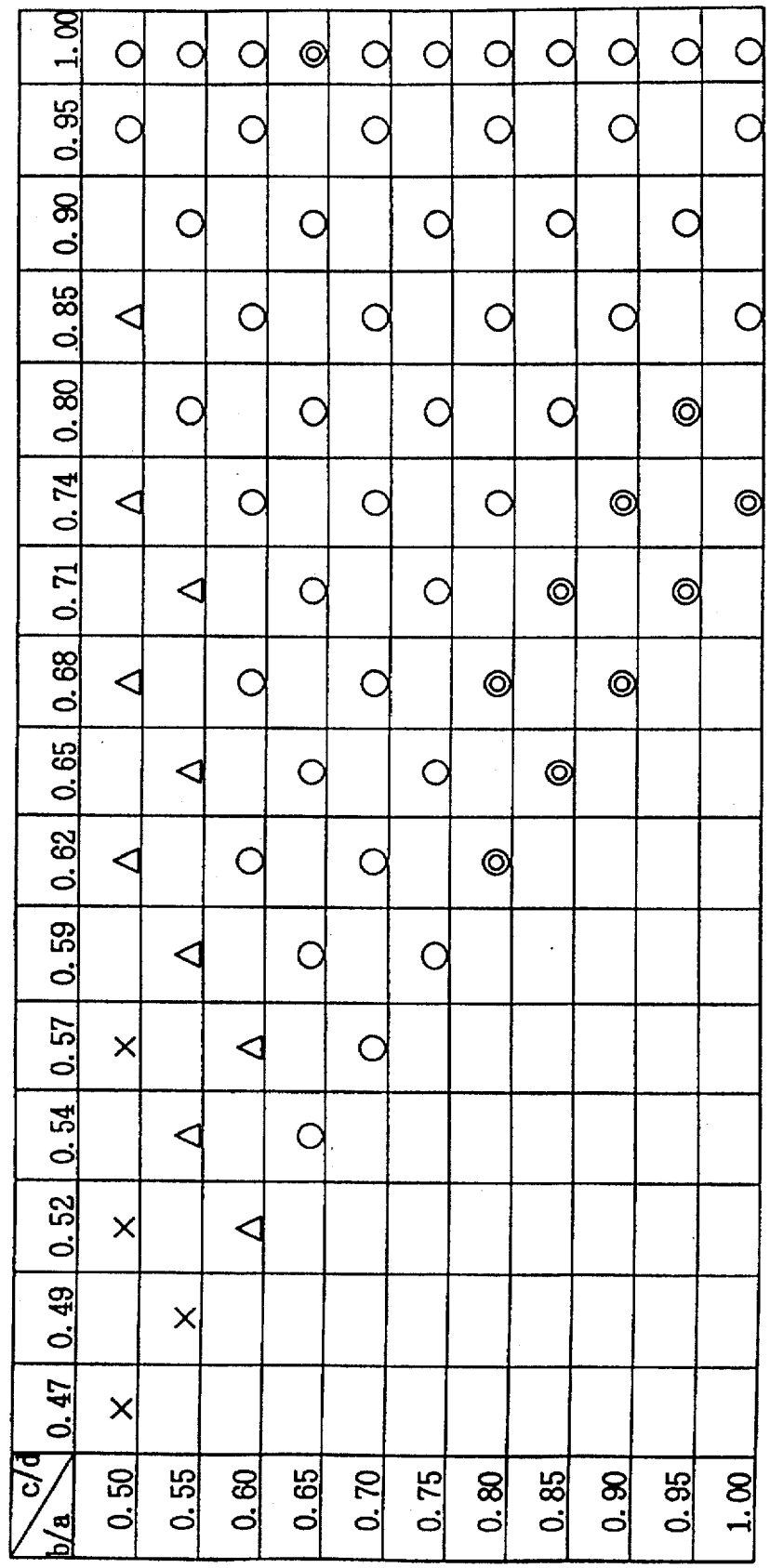
[FIG. 31] Table showing the generated states of nonuniformity of rotation when a/p=0.85.
Figure 34:
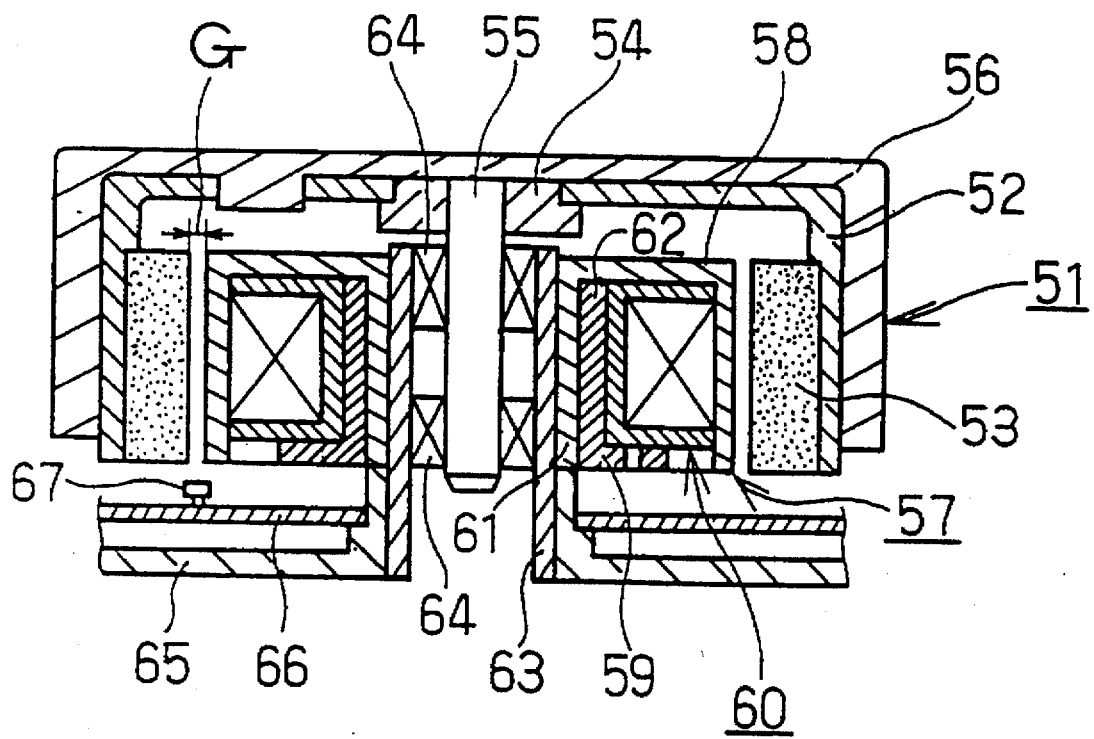
[FIG. 34] A vertical sectional view showing a conventional brushless DC motor.
Figure 35:
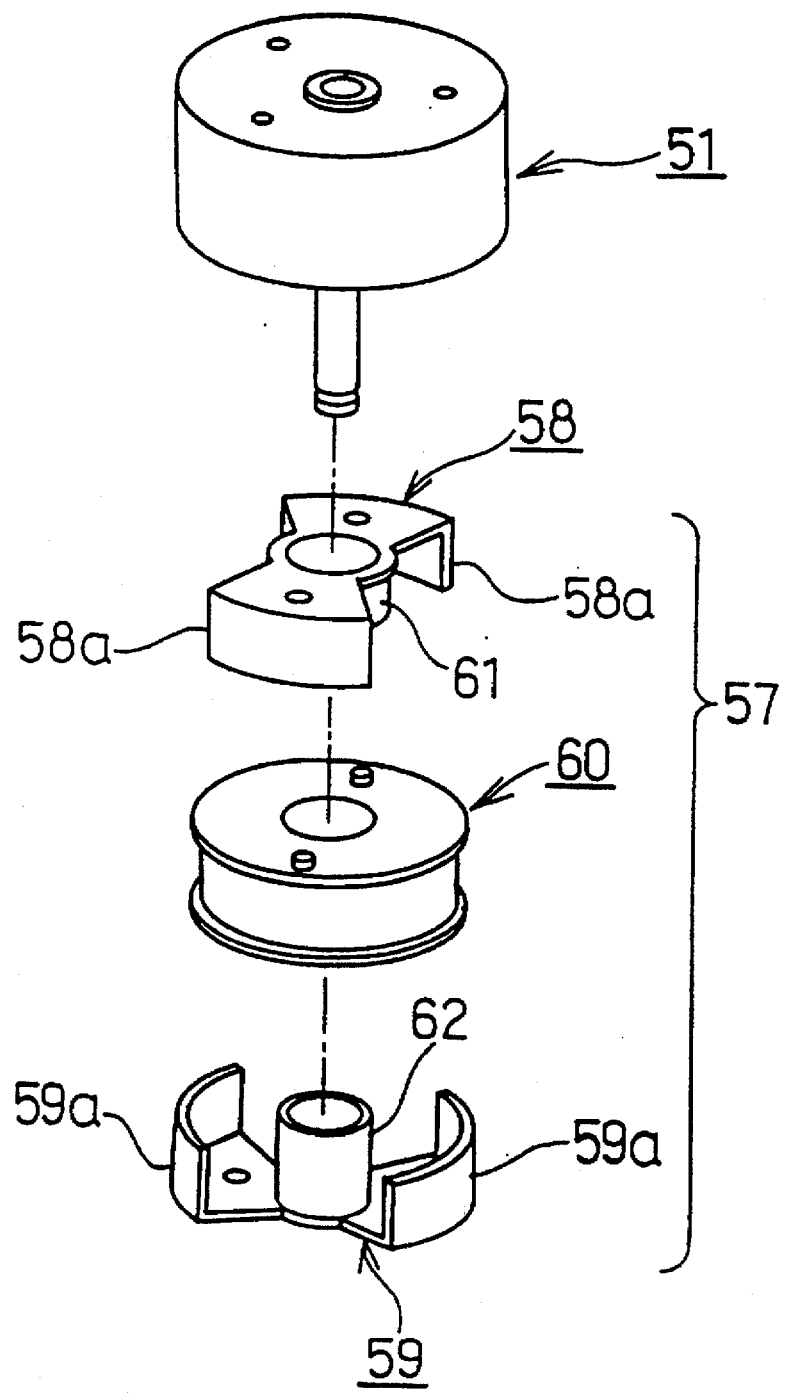
[FIG. 35] An exploded sectional view of a conventional brushless DC motor.
Figure 36:
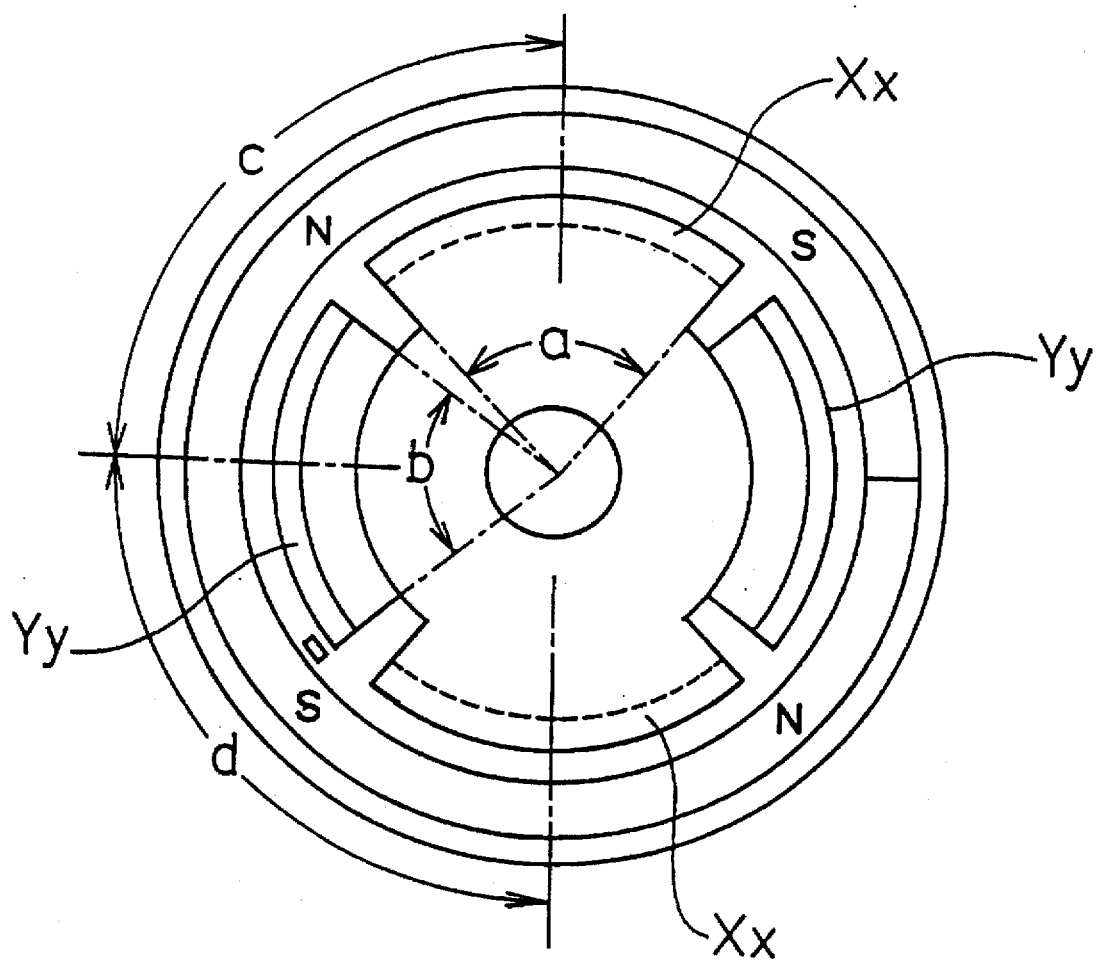
[FIG. 36] A plan view showing a stator yoke and a magnet.

In FIG. 31, (a/p) is 0.85. In this example, (1) when b/a is 0.50 to 1.00, and c/d is 0.95 to 1.00, (2) when b/a is 0.55 to 1.00, and c/d is 0.80 to 1.00, (3) when b/a is 0.60 to 1.00, and c/d is 0.62 to 1.00, and (4) when b/a is 0.65 to 1.00, and c/d is 0.54 to 1.00, a motor rotation with less nonuniformity of rotation is obtained.

Figure 32:
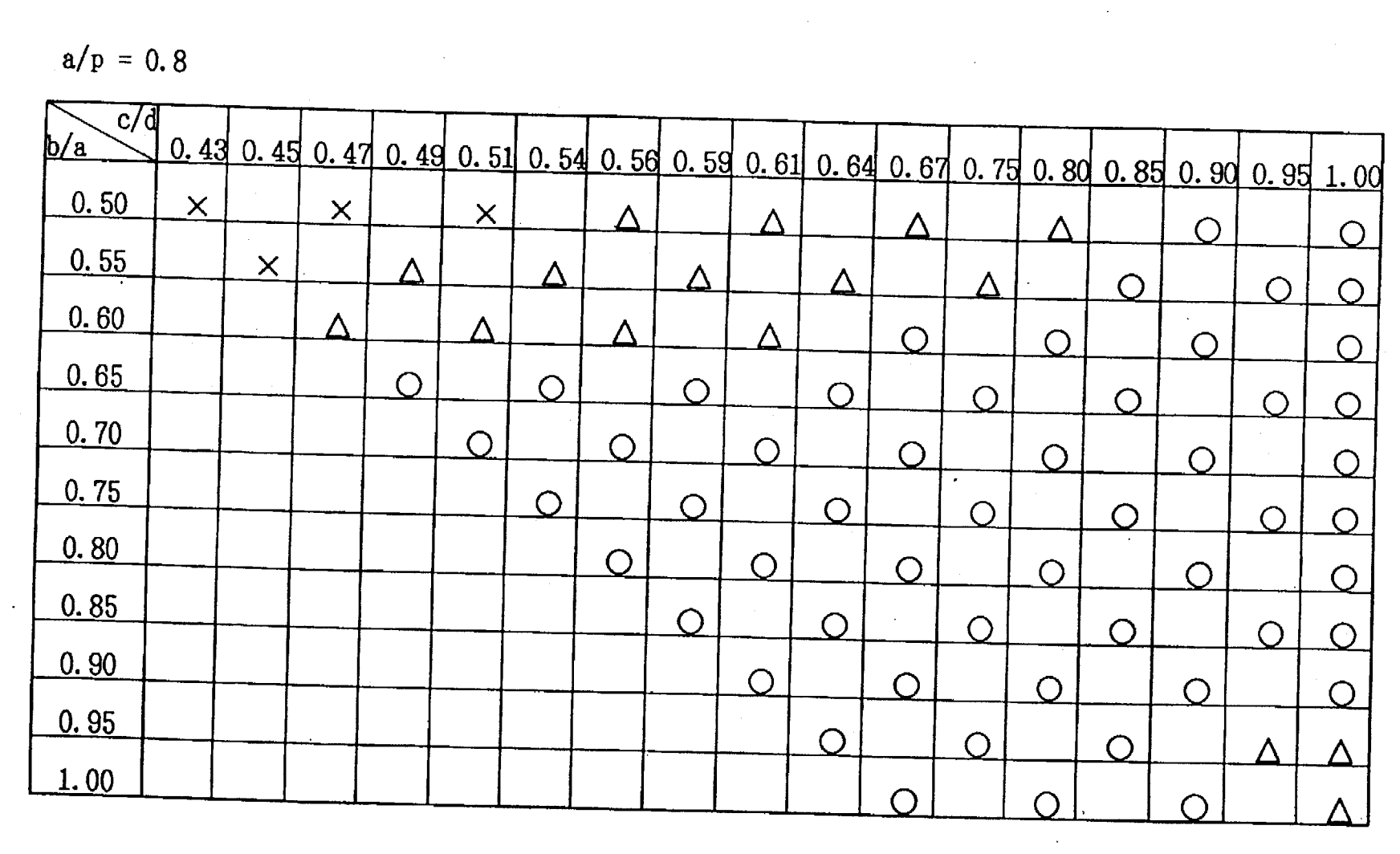

In FIG. 32, (a/p) is 0.80. In this example, (1) when b/a is 0.50 to 1.00, and c/d is 0.90, (2) when b/a is 0.50 to 0.90, and c/d is 0.90 to 1.00, (3) when b/a is 0.55 to 1.00, and c/d is 0.85 to 0.90, (4) when b/a is 0.55 to 0.90, and c/d is 0.85 to 1.00, (5) when b/a is 0.60 to 1.00, and c/d is 0.67 to 0.90, (6) when b/a is 0.60 to 0.90, and c/d is 0.67 to 1.00, (7) when b/a is 0.65 to 1.00, and c/d is 0.49 to 0.90, and (8) when b/a is 0.65 to 0.90, and c/d is 0.49 to 1.00, a motor rotation with less nonuniformity of rotation is obtained.

In FIG. 53, (a/p) is 0.75. In this example, (1) when b/a is 0.50 to 1.00, and c/d is 0.80 to 1.00, (2) when b/a is 0.55 to 1.00, and c/d is 0.75 to 1.00, (3) when b/a is 0.60 to 1.00, and c/d is 0.60 to 1.00, (4) when b/a is 0.65 to 1.00, and c/d is 0.53 to 1.00, and (5) when b/a is 0.70 to 1.00, and c/d is 0.47 to 1.00, a motor rotation with less nonuniformity of rotation is obtained.

When (a/p) is 0.70, a good result cannot be obtained. Therefore, (a/p) is desired to exceed 0.7.

Reasons why a motor rotation which is possible to make self-activation and has less nonuniformity of rotation can be obtained are as follows.

In a case that (a/p) is 1.0, when b/a is 0.50 to 0.90 and c/d is 0.60 to 0.95, a motor rotation which is possible to make self-activation and has less nonuniformity of rotation can be obtained.

In a case that (a/p) is 0.95, when b/a is 0.50 to 0.95 and c/d is 0.56 to 0.91, a motor rotation which is possible to make self-activation and has less nonuniformity of rotation can be obtained.

In a case that (a/p) is 0.90, (1) when b/a is 0.50 to 1.00 and c/d is 0.78 to 0.95, (2) when b/a is 0.55 to 0.95 and c/d is 0.62 to 0.95, (3) when b/a is 0.60 to 0.95 and c/d is 0.59 to 0.95, and (4) when b/a is 0.65 to 0.95 and c/d is 0.57 to 0.95, a motor rotation which is possible to make self-activation and has less nonuniformity of rotation can be obtained.

In a case that (a/p) is 0.85, (1) when b/a is 0.50 to 0.95 and c/d is 0.95 to 0.95, (2) when b/a is 0.55 to 0.95 and c/d is 0.80 to 0.95, (3) when b/a is 0.60 to 0.95 and c/d is 0.62 to 0.95, and (4) when b/a is 0.65 to 0.95 and c/d is 0.54 to 0.95, a motor rotation which is possible to make self-activation and has less nonuniformity of rotation can be obtained.

In a case that (a/p) is 0.80, (1) when b/a is 0.50 to 0.95 and c/d is 0.90, (2) when b/a is 0.50 to 0.90 and c/d is 0.90 to 0.95, (3) when b/a is 0.55 to 0.95 and c/d is 0.85 to 0.90, (4) when b/a is 0.55 to 0.90 and c/d is 0.85 to 0.95, (5) when b/a is 0.60 to 0.95 and c/d is 0.67 to 0.90, (6) when b/a is 0.60 to 0.90 and c/d is 0.67 to 0.95, (7) when b/a is 0.65 to 0.95 and c/d is 0.49 to 0.90, and (8) when b/a is 0.65 to 0.90 and c/d is 0.49 to 0.95, a motor rotation which is possible to make self-activation and has less nonuniformity of rotation can be obtained.

In a case that (a/p) is 0.75, (1) when b/a is 0.50 to 0.95 and c/d is 0.80 to 0.90, (2) when b/a is 0.55 to 0.95 and c/d is 0.75 to 0.90, (3) when b/a is 0.65 to 0.95 and c/d is 0.60 to 0.90, (4) when b/a is 0.65 to 0.95 and c/d is 0.53 to 0.90, and (5) when b/a is 0.70 to 0.95 and c/d is 0.47 to 0.90, a motor rotation which is possible to make self-activation and has less nonuniformity of rotation can be obtained.

Although the examples have been described in connection with an outer rotor type motor with a ferrite magnet, this invention is not limited such a motor, and may be applied to an inner rotor type motor and another motor using another magnet. And, in addition to the single-phase bipolar drive used in the examples, two-phase, three-phase, ... unipolar drives to which this invention can be applied are covered by this invention. Further, in the aforementioned examples, the rotor position is detected with the hole element, but this invention can be applied to another sensor drive other than the hole element and to a so-called sensorless drive which does not, use a sensor and switches the coil's current by detecting the rotor position by a back electromotive force for example.

INDUSTRIAL APPLICABILITY

The brushless DC motor of this invention can improve the self-starting reliability by a relatively simple structure and can obtain a motor structure capable of lowering the rotational speed fluctuation and a method for driving a motor, so that it can be suitable to compact disk players, all sorts of audio equipment, and OA equipment which require accurate rotation.

We claim:

1. A brushless DC motor comprising:

a cylindrical or segment shaped permanent magnet rotor which has N and S poles alternately magnetized at an equal pole pitch p in the circumferential direction, a stator consisting of two stator yokes disposed to oppose to each other, each stator yoke having a soft magnetic metal plate folded to form claw poles half in number of the number of poles of said permanent magnet rotor, said stator being made by combining these claw poles, and a cylindrical coil which is positioned between the stator yokes and excites said stator, wherein among claw poles Xx, Yy, ... of said two stator yokes X, Y, two adjacent claw poles Xx, Yy form a pair of claw poles, width a of said claw pole Xx and width b of said claw pole Yy are not equal; claw pole pitch c and claw pole pitch d of claw pole pitches c, d, c, d, ... connecting the midpoints of each claw pole Xx, Yy, ... are not equal; among claw poles Xx, Yy of said each claw pole set, width a of claw pole Xx residing in the rotating direction of said permanent magnet rotor is formed to be larger than width b of the other claw pole Yy, and claw pole pitch c from said claw pole Xx to said claw pole Yy is formed to be smaller than claw pole pitch d from said claw pole Yy to said claw pole Xx, and characterized by setting a ratio (a/p) of the claw pole width a and the pole pitch p, a ratio (b/a) of the claw pole width a and the claw pole width b, and a ratio (c/d) of the claw pole pitch c and the claw pole pitch d to fall in any of the following range:

in a case that (a/p) is 1.0, (c/d) is 0.60 to 0.95 and (b/a) is 0.50 to 0.95, in a case that (a/p) is 0.95, (c/d) is 0.56 to 0.91 and (b/a) is 0.50 to 0.95, in a case that (a/p) is 0.90, (c/d) is 0.49 to 0.95 and (b/a) is 0.50 to 0.95, in a case that (a/p) is 0.85, (c/d) is 0.47 to 0.95 and (b/a) is 0.50 to 0.95, in a case that (a/p) is 0.80, (c/d) is 0.43 to 0.95 and (b/a) is 0.50 to 0.95, and in a case that (a/p) is 0.75, (c/d) is 0.39 to 0.90 and (b/a) is 0.50 to 0.95.

2. A brushless DC motor comprising:

a cylindrical or segment shaped permanent magnet rotor which has N and S poles alternately magnetized at an equal pole pitch p in the circumferential direction, a stator consisting of two stator yokes disposed to oppose to each other, each stator yoke having a soft magnetic metal plate folded to form claw poles half in number of the number of poles of said permanent magnet rotor, said stator being made by combining these claw poles, and a cylindrical coil which is positioned between the stator yokes and excites said stator, wherein among claw poles Xx, Yy, ... of said two stator yokes X, Y, two adjacent claw poles Xx, Yy form a pair of claw poles, width a of said claw pole Xx and width b of said claw pole Yy are not equal; claw pole pitch c and claw pole pitch d of claw pole pitches c, d, c, d, ... connecting the midpoints of each claw pole Xx, Yy, ... are not equal; among claw poles Xx, Yy of said each claw pole set, width a of claw pole Xx residing in the rotating direction of said permanent magnet rotor is formed to be larger than width b of the other claw pole Yy, and claw pole pitch c from said claw pole Xx to said claw pole Yy is formed to be smaller than claw pole pitch d from said claw pole Yy to said claw pole Xx, and characterized by setting a ratio (a/p) of the claw pole width a and the pole pitch p, a ratio (b/a) of the claw pole width a and the claw pole width b, and a ratio (c/d) of the claw pole pitch c and the claw pole pitch d to fall in any of the following range:

in a case that (a/p) is 1.0,
(1) when (b/a) is 0.50 to 0.90, (c/d) is 0.60 to 0.95, or
(2) when (b/a) is 0.50 to 0.95, (c/d) is 0.60 to 1.00, in a case that (a/p) is 0.95, when (b/a) is equal to or greater than 0.50 but less than 1.00, (c/d) is 0.56 to 1.00, in a case that (a/p) is 0.90,
(1) when (b/a) is equal to or greater than 0.50 but less than 1.00, (c/d) is 0.78 to 1.00,
(2) when (b/a) is equal to or greater than 0.55 but less than 1.00, (c/d) is 0.62 to 1.00,
(3) when (b/a) is equal to or greater than 0.60 but less than 1.00, (c/d) is 0.59 to 1.00, or
(4) when (b/a) is equal to or greater than 0.65 but less than 1.00, (c/d) is 0.57 to 1.00.

in a case that (a/p) is 0.85,
(1) when (b/a) is equal to or greater than 0.50 but less than 1.00, (c/d) is 0.95 to 1.00,
(2) when (b/a) is equal to or greater than 0.50 but less than 0.95, (c/d) is 0.80 to 1.00,
(3) when (b/a) is equal to or greater than 0.60 but less than 1.00, (c/d) is 0.62 to 1.00, or
(4) when (b/a) is equal to or greater than 0.65 but less than 1.00, (c/d) is 0.54 to 1.00, in a case that (a/p) is 0.80,
(1) when (b/a) is equal to or greater than 0.50 but less than 1.00, (c/d) is 0.90,
(2) when (b/a) is 0.50 to 0.90, (c/d) is 0.90 to 1.00,
(3) when (b/a) is equal to or greater than 0.50 but less than 1.00, (c/d) is 0.85 to 0.90,
(4) when (b/a) is 0.55 to 0.90, (c/d) is 0.85 to 1.00,
(5) when (b/a) is equal to or greater than 0.60 but less than 1.00, (c/d) is 0.67 to 0.90,
(6) when (b/a) is 0.60 to 0.90, (c/d) is 0.67 to 1.00.
(7) when (b/a) is equal to or greater than 0.65 but less than 1.00, (c/d) is 0.49 to 0.90, or
(8) when (b/a) is 0.65 to 0.90, (c/d) is 0.49 to 1.00, in a case that (a/p) is 0.75,
(1) when (b/a) is equal to or greater than 0.50 but less than 1.00, (c/d) is 0.80 to 1.00,
(2) when (b/a) is equal to or greater than 0.55 but less than 1.00, (c/d) is 0.75 to 1.00,
(3) when (b/a) is equal to or greater than 0.60 but less than 1.00, (c/d) is 0.60 to 1.00, or
(4) when (b/a) is equal to or greater than 0.65 but less than 1.00, (c/d) is 0.53 to 1.00, or (5) when (b/a) is equal to or greater than 0.70 but less than 1.00, (c/d) is 0.47 to 1.00.

3. A brushless DC motor comprising:

a cylindrical or segment shaped permanent magnet rotor which has N and S poles alternately magnetized at an equal pole pitch p in the circumferential direction, a stator consisting of two stator yokes disposed to oppose to each other, each stator yoke having a soft magnetic metal plate folded to form claw poles half in number of the number of poles of said permanent magnet rotor, said stator being made by combining these claw poles, and a cylindrical coil which is positioned between the stator yokes and excites said stator, wherein among claw poles Xx, Yy, ... of said two stator yokes X, Y, two adjacent claw poles Xx, Yy form a pair of claw poles, width a of said claw pole Xx and width b of said claw pole Yy are not equal; claw pole pitch c and claw pole pitch d of claw pole pitches c, d, c, d, ... connecting the midpoints of each claw pole Xx, Yy, ... are not equal; among claw poles Xx, Yy of said each claw pole set, width a of claw pole Xx residing in the rotating direction of said permanent magnet rotor is formed to be larger than width b of the other claw pole Yy, and claw pole pitch c from said claw pole Xx to said claw pole Yy is formed to be smaller than claw pole pitch d from said claw pole Yy to said claw pole Xx, and characterized by setting a ratio (a/p) of the claw pole width a and the pole pitch p, a ratio (b/a) of the claw pole width a and the claw pole width b, and a ratio (c/d) of the claw pole pitch c and the claw pole pitch d to fall in any of the following range:

in a case that (a/p) is 1.0, (b/a) is 0.50 to 0.90 and (c/d) is 0.60 to 0.95, in a case that (a/p) is 0.95, (b/a) is 0.50 to 0.95 and (c/d) is 0.56 to 0.91 in a case that (a/p) is 0.90,
(1) when (b/a) is equal to or greater than 0.50 but less than 1.00, (c/d) is 0.78 to 0.95,
(2) when (b/a) is 0.55 to 0.95, (c/d) is 0.62 to 0.95,
(3) when (b/a) is 0.60 to 0.95, (c/d) is 0.59 to 0.95, or
(4) when (b/a) is 0.65 to 0.95, (c/d) is 0.57 to 0.95, in a case that (a/p) is 0.85,
(1) when (b/a) is 0.50 to 0.95, (c/d) is 0.95 to 0.95,
(2) when (b/a) is 0.55 to 0.95, (c/d) is 0.80 to 0.95,
(3) when (b/a) is 0.60 to 0.95, (c/d) is 0.62 to 0.95, or
(4) when (b/a) is 0.65 to 0.95, (c/d) is 0.54 to 0.95, in a case that (a/p) is 0.80,
(1) when (b/a) is 0.50 to 0.95, (c/d) is 0.90,
(2) when (b/a) is 0.50 to 0.90, (c/d) is 0.90 to 0.95,
(3) when (b/a) is 0.55 to 0.95, (c/d) is 0.85 to 0.90,
(4) when (b/a) is 0.55 to 0.90, (c/d) is 0.85 to 0.95,
(5) when (b/a) is 0.60 to 0.95, (c/d) is 0.67 to 0.90,
(6) when (b/a) is 0.60 to 0.90, (c/d) is 0.67 to 0.95.
(7) when (b/a) is 0.65 to 0.95, (c/d) is 0.49 to 0.90, or
(8) when (b/a) is 0.65 to 0.90, (c/d) is 0.49 to 0.95, in a case that (a/p) is 0.75,
(1) when (b/a) is 0.50 to 0.95, (c/d) is 0.80 to 0.90,
(2) when (b/a) is 0.55 to 0.95, (c/d) is 0.75 to 0.90,
(3) when (b/a) is 0.60 to 0.95, (c/d) is 0.60 to 0.90,
(4) when (b/a) is 0.65 to 0.95, (c/d) is 0.53 to 0.90, or
(5) when (b/a) is 0.70 to 0.95, (c/d) is 0.47 to 0.90.

* * * * *